US006935931B2

(12) United States Patent
Prasad

(10) Patent No.: US 6,935,931 B2
(45) Date of Patent: Aug. 30, 2005

(54) MICROPOROUS POLISHING PADS

(75) Inventor: Abaneshwar Prasad, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 117 days.

(21) Appl. No.: 10/792,348

(22) Filed: Mar. 3, 2004

(65) Prior Publication Data

US 2004/0171340 A1 Sep. 2, 2004

Related U.S. Application Data

(62) Division of application No. 10/281,782, filed on Oct. 28, 2002.
(60) Provisional application No. 60/382,739, filed on May 23, 2002.

(51) Int. Cl.[7] .................................................. B24D 7/22
(52) U.S. Cl. ......................... 451/41; 451/526; 451/534; 51/297
(58) Field of Search ........................ 451/41, 526, 534, 451/539; 51/297; 521/79, 81, 92, 142; 264/45.9

(56) References Cited

U.S. PATENT DOCUMENTS

| | | |
|---|---|---|
| 4,138,228 A | 2/1979 | Hartfelt et al. |
| 4,239,567 A | 12/1980 | Winings |
| 4,954,141 A | 9/1990 | Takiyama et al. |
| 5,182,307 A | 1/1993 | Kumar |
| 5,489,233 A | 2/1996 | Cook et al. |
| 5,605,760 A | 2/1997 | Roberts |
| 5,628,862 A | 5/1997 | Yu et al. |
| 5,684,055 A | 11/1997 | Kumar et al. |
| 5,893,796 A | 4/1999 | Birang et al. |
| 5,964,643 A | 10/1999 | Birang et al. |
| 6,017,265 A | 1/2000 | Cook et al. |
| 6,022,268 A | 2/2000 | Roberts et al. |
| 6,045,439 A | 4/2000 | Birang et al. |
| 6,062,968 A | 5/2000 | Sevilla et al. |
| 6,089,965 A | 7/2000 | Otawa et al. |
| 6,117,000 A * | 9/2000 | Anjur et al. ................. 451/526 |

(Continued)

FOREIGN PATENT DOCUMENTS

| | | |
|---|---|---|
| EP | 0 239 040 A1 | 9/1987 |
| EP | 1 046 466 A2 | 10/2000 |
| EP | 1 108 500 A1 | 6/2001 |
| WO | WO 98/28108 A1 | 7/1998 |
| WO | WO 98/47662 A1 | 10/1998 |
| WO | WO 00/26005 A1 | 5/2000 |
| WO | WO 00/59702 A1 | 10/2000 |
| WO | WO 01/15863 A1 | 3/2001 |
| WO | WO 01/15885 A1 | 3/2001 |
| WO | WO 01/36521 A2 | 5/2001 |
| WO | WO 01/68322 A1 | 9/2001 |
| WO | WO 01/94074 A1 | 12/2001 |
| WO | WO 02/02274 A2 | 1/2002 |
| WO | WO 02/09907 A1 | 2/2002 |
| WO | WO 02/30617 A1 | 4/2002 |

*Primary Examiner*—Lee D. Wilson
*Assistant Examiner*—Anthony Ojini
(74) *Attorney, Agent, or Firm*—Caryn Borg-Breen

(57) ABSTRACT

The invention provides polishing pads for chemical-mechanical polishing comprising a porous foam and a method for their production. In one embodiment, the porous foam has an average pore size of about 50 μm or less, wherein about 75% or more of the pores have a pore size within about 20 μm or less of the average pore size. In another embodiment, porous foam has an average pore size of about 20 μm or less. In yet another embodiment, the porous foam has a multi-modal pore size distribution. The method of production comprises (a) combining a polymer resin with a supercritical gas to produce a single-phase solution and (b) forming a polishing pad from the single-phase solution, wherein the supercritical gas is generated by subjecting a gas to an elevated temperature and pressure.

15 Claims, 15 Drawing Sheets

U.S. PATENT DOCUMENTS

| | | |
|---|---|---|
| 6,120,353 A | 9/2000 | Suzuki et al. |
| 6,126,532 A * | 10/2000 | Sevilla et al. ............... 451/526 |
| 6,146,242 A | 11/2000 | Treur et al. |
| 6,169,122 B1 | 1/2001 | Bizard et al. |
| 6,171,181 B1 | 1/2001 | Roberts et al. |
| 6,231,942 B1 | 5/2001 | Blizard et al. |
| 6,235,380 B1 | 5/2001 | Tupil et al. |
| 6,245,406 B1 | 6/2001 | Kuramochi et al. |
| 6,284,810 B1 | 9/2001 | Burnham et al. |
| 6,290,883 B1 | 9/2001 | Crevasse et al. |
| 6,328,644 B1 | 12/2001 | Kuramochi et al. |
| 6,358,130 B1 | 3/2002 | Freeman et al. |
| 6,368,200 B1 | 4/2002 | Merchant et al. |
| 6,626,740 B2 * | 9/2003 | Baker et al. .................. 451/41 |
| 6,685,540 B2 * | 2/2004 | Cherian et al. ............... 451/41 |
| 2001/0018121 A1 | 8/2001 | Okamoto et al. |
| 2001/0033040 A1 | 10/2001 | Cardona et al. |
| 2002/0010232 A1 | 1/2002 | Ogawa et al. |
| 2002/0016146 A1 | 2/2002 | Kuramochi et al. |
| 2003/0233792 A1 | 12/2003 | Kramer ...................... 51/300 |

* cited by examiner

MICROPOROUS POLISHING PADS

CROSS-REFERENCE TO RELATED PATENT APPLICATIONS

This patent application is a divisional of copending U.S. patent application Ser. No. 10/281,782, filed Oct. 28, 2002. This patent application claims the benefit of U.S. Provisional Patent Application No. 60/382,739, filed May 23, 2002.

FIELD OF THE INVENTION

This invention pertains to polishing pads for chemical-mechanical polishing comprising a porous foam having a uniform pore size distribution.

BACKGROUND OF THE INVENTION

Chemical-mechanical polishing ("CMP") processes are used in the manufacturing of microelectronic devices to form flat surfaces on semiconductor wafers, field emission displays, and many other microelectronic substrates. For example, the manufacture of semiconductor devices generally involves the formation of various process layers, selective removal or patterning of portions of those layers, and deposition of yet additional process layers above the surface of a semiconducting substrate to form a semiconductor wafer. The process layers can include, by way of example, insulation layers, gate oxide layers, conductive layers, and layers of metal or glass, etc. It is generally desirable in certain steps of the wafer process that the uppermost surface of the process layers be planar, i.e., flat, for the deposition of subsequent layers. CMP is used to planarize process layers wherein a deposited material, such as a conductive or insulating material, is polished to planarize the wafer for subsequent process steps.

In a typical CMP process, a wafer is mounted upside down on a carrier in a CMP tool. A force pushes the carrier and the wafer downward toward a polishing pad. The carrier and the wafer are rotated above the rotating polishing pad on the CMP tool's polishing table. A polishing composition (also referred to as a polishing slurry) generally is introduced between the rotating wafer and the rotating polishing pad during the polishing process. The polishing composition typically contains a chemical that interacts with or dissolves portions of the uppermost wafer layer(s) and an abrasive material that physically removes portions of the layer(s). The wafer and the polishing pad can be rotated in the same direction or in opposite directions, whichever is desirable for the particular polishing process being carried out. The carrier also can oscillate across the polishing pad on the polishing table.

Polishing pads used in chemical-mechanical polishing processes are manufactured using both soft and rigid pad materials, which include polymer-impregnated fabrics, microporous films, cellular polymer foams, non-porous polymer sheets, and sintered thermoplastic particles. A pad containing a polyurethane resin impregnated into a polyester non-woven fabric is illustrative of a polymer-impregnated fabric polishing pad. Microporous polishing pads include microporous urethane films coated onto a base material, which is often an impregnated fabric pad. These polishing pads are closed cell, porous films. Cellular polymer foam polishing pads contain a closed cell structure that is randomly and uniformly distributed in all three dimensions. Non-porous polymer sheet polishing pads include a polishing surface made from solid polymer sheets, which have no intrinsic ability to transport slurry particles (see, for example, U.S. Pat. No. 5,489,233). These solid polishing pads are externally modified with large and/or small grooves that are cut into the surface of the pad purportedly to provide channels for the passage of slurry during chemical-mechanical polishing. Such a non-porous polymer polishing pad is disclosed in U.S. Pat. No. 6,203,407, wherein the polishing surface of the polishing pad comprises grooves that are oriented in such a way that purportedly improves selectivity in the chemical-mechanical polishing. Also in a similar fashion, U.S. Pat. Nos. 6,022,268, 6,217,434, and 6,287,185 disclose hydrophilic polishing pads with no intrinsic ability to absorb or transport slurry particles. The polishing surface purportedly has a random surface topography including microaspersities that have a dimension of 10 $\mu$m or less and formed by solidifying the polishing surface and macro defects (or macrotexture) that have a dimension of 25 $\mu$m or greater and formed by cutting. Sintered polishing pads comprising a porous open-celled structure can be prepared from thermoplastic polymer resins. For example, U.S. Pat. Nos. 6,062,968 and 6,126,532 disclose polishing pads with open-celled, microporous substrates, produced by sintering thermoplastic resins. The resulting polishing pads preferably have a void volume between 25 and 50% and a density of 0.7 to 0.9 g/cm$^3$. Similarly, U.S. Pat. Nos. 6,017,265, 6,106,754, and 6,231,434 disclose polishing pads with uniform, continuously interconnected pore structures, produced by sintering thermoplastic polymers at high pressures in excess of 689.5 kPa (100 psi) in a mold having the desired final pad dimensions.

In addition to groove patterns, polishing pads can have other surface features to provide texture to the surface of the polishing pad. For example, U.S. Pat. No. 5,609,517 discloses a composite polishing pad comprising a support layer, nodes, and an upper layer, all with different hardness. U.S. Pat. No. 5,944,583 discloses a composite polishing pad having circumferential rings of alternating compressibility. U.S. Pat. No. 6,168,508 discloses a polishing pad having a first polishing area with a first value of a physical property (e.g., hardness, specific gravity, compressibility, abrasiveness, height, etc.) and a second polishing area with a second value of the physical property. U.S. Pat. No. 6,287,185 discloses a polishing pad having a surface topography produced by a thermoforming process. The surface of the polishing pad is heated under pressure or stress resulting in the formation of surface features.

Polishing pads having a microporous foam structure are commonly known in the art. For example, U.S. Pat. No. 4,138,228 discloses a polishing article that is microporous and hydrophilic. U.S. Pat. No. 4,239,567 discloses a flat microcellular polyurethane polishing pad for polishing silicon wafers. U.S. Pat. No. 6,120,353 discloses a polishing method using a suede-like foam polyurethane polishing pad having a compressibility lower than 9% and a high pore density of 150 pores/cm$^2$ or higher. EP 1 108 500 A1 discloses a polishing pad of micro-rubber A-type hardness of at least 80 having closed cells of average diameter less than 1000 $\mu$m and a density of 0.4 to 1.1 g/ml.

Although several of the above-described polishing pads are suitable for their intended purpose, a need remains for an improved polishing pad that provides effective planarization, particularly in substrate polishing by chemical-mechanical polishing. In addition, there is a need for polishing pads having improved polishing efficiency, improved slurry flow across and within the polishing pad, improved resistance to corrosive etchants, and/or improved polishing uniformity. Finally, there is a need for polishing pads that can be produced using relatively low cost methods and which require little or no conditioning prior to use.

The invention provides such a polishing pad. These and other advantages of the invention, as well as additional inventive features, will be apparent from the description of the invention provided herein.

BRIEF SUMMARY OF THE INVENTION

The invention provides polishing pads for chemical-mechanical polishing comprising a porous foam. In a first embodiment, the porous foam has an average pore size of about 50 μm or less, wherein about 75% or more of the pores have a pore size within about 20 μm or less of the average pore size. In a second embodiment, the polishing pad comprises a porous foam with an average pore size of about 1 μm to about 20 μm. In a third embodiment, the polishing pad comprises a thermoplastic polyurethane foam having an average pore size of about 50 μm or less, wherein the thermoplastic polyurethane has a Melt Flow Index of about 20 or less, a molecular weight of about 50,000 g/mol to about 300,000 g/mol, and a polydispersity index of about 1.1 to about 6. In a fourth embodiment, the polishing pad is a polyurethane polishing pad comprising a polishing surface with no externally produced surface texture, which can polish a silicon dioxide wafer at a rate of at least 600 Å/min with a carrier downforce pressure of about 0.028 MPa (4 psi), a slurry flow rate of about 100 ml/min, a platen rotation speed of about 60 rpm, and a carrier rotation speed of about 55 rpm to about 60 rpm. In a fifth embodiment, the polishing pad comprises a porous foam having a multi-modal pore size distribution, wherein the multi-modal distribution has about 20 or less pore size maxima.

The invention further provides a method for producing the polishing pads comprising (a) combining a polymer resin with a supercritical gas to produce a single-phase solution, wherein the supercritical gas is generated by subjecting a gas to an elevated temperature and pressure, and (b) forming a polishing pad from the single-phase solution.

DETAILED DESCRIPTION OF THE INVENTION

Figure 1:
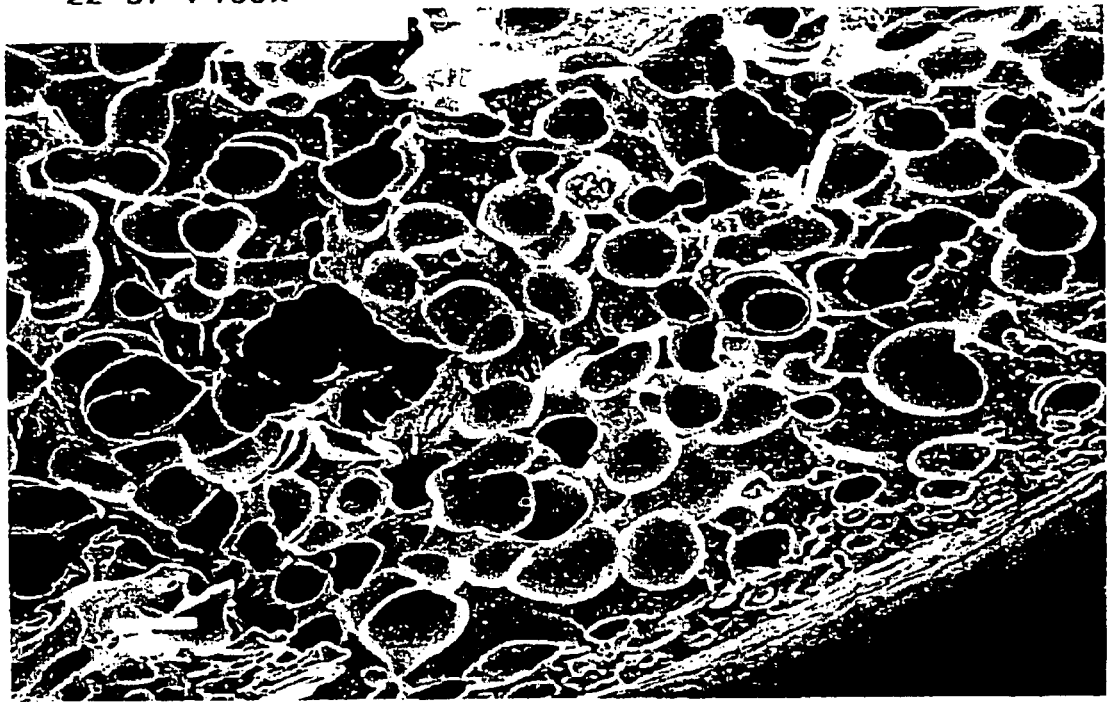
FIG. 1 is a scanning electron microscopy (SEM) image (100× magnification) of a cross-section of an extruded porous foam rod produced with a $CO_2$ concentration of 1.26% and a melt temperature of 212° C. (414° F.).

In a first embodiment, the invention is directed to a polishing pad for chemical-mechanical polishing comprising a porous foam with an average pore size of about 50 μm or less. Preferably, the porous foam has an average pore size of about 40 μm or less, or even about 30 μm or less (e.g. about 20 μm or less). Typically, the porous foam has an average pore size of about 1 μm or more (e.g., about 3 μm or more, or about 5 μm or more).

In a second, preferred embodiment, the porous foam has an average pore size of about 1 µm to about 20 µm. Preferably, the porous foam has an average pore size of about 1 µm to about 15 µm (e.g., about 1 µm to about 10 µm).

The porous foam of the polishing pads described herein has a highly uniform distribution of pore sizes (i.e., cell sizes). Typically, about 75% or more (e.g., about 80% or more, or about 85% or more) of the pores (e.g., cells) in the porous foam have a pore size distribution of about ±20 µm or less (e.g., about ±10 µm or less, about +5 µm or less, or about ±2 µm or less). In other words, about 75% or more (e.g., about 80% or more, or about 85% or more) of the pores in the porous foam have a pore size within about 20 µm or less (e.g., about ±10 µm or less, about +5 µm or less, or about ±2 µm or less) of the average pore size. Preferably, about 90% or more (e.g., about 93% or more, about 95% or more, or about 97% or more) of the pores (e.g., cells) in the porous foam have a pore size distribution of about ±20 µm or less (e.g., about ±10 µm or less, about ±5 µm or less, or about ±2 µm or less).

Typically, the porous foam comprises predominantly closed cells (i.e., pores); however, the porous foam can also comprise open cells. Preferably, the porous foam comprises at least about 5% or more (e.g., at least about 10% or more) closed cells. More preferably, the porous foam comprises at least about 20% or more (e.g., at least about 40% or more, or at least about 60% or more) closed cells.

The porous foam typically has a density of about 0.5 g/cm$^3$ or greater (e.g., about 0.7 g/cm$^3$ or greater, or even about 0.9 g/cm$^3$ or greater) and a void volume of about 25% or less (e.g., about 15% or less, or even about 5% or less). Typically the porous foam has a cell density of about $10^5$ cells/cm$^3$ or greater (e.g., about $10^6$ cells/cm$^3$ or greater). The cell density can be determined by analyzing a cross-sectional image (e.g., an SEM image) of a porous foam material with an image analysis software program such as Optimas® imaging software and ImagePro® imaging software, both by Media Cybernetics, or Clemex Vision® imaging software by Clemex Technologies.

The porous foam can comprise any suitable material, typically a polymer resin. The porous foam preferably comprises a polymer resin selected from the group consisting of thermoplastic elastomers, thermoplastic polyurethanes, polyolefins, polycarbonates, polyvinylalcohols, nylons, elastomeric rubbers, styrenic polymers, polyaromatics, fluoropolymers, polyimides, cross-linked polyurethanes, cross-linked polyolefins, polyethers, polyesters, polyacrylates, elastomeric polyethylenes, polytetrafluoroethylenes, polyethyleneteraphthalates, polyimides, polyaramides, polyarylenes, polystyrenes, polymethylmethacrylates, copolymers and block copolymers thereof, and mixtures and blends thereof. Preferably, the polymer resin is thermoplastic polyurethane.

The polymer resin typically is a pre-formed polymer resin; however, the polymer resin also can be formed in situ according to any suitable method, many of which are known in the art (see, for example, *Szycher's Handbook of Polyurethanes* CRC Press: New York, 1999, Chapter 3). For example, thermoplastic polyurethane can be formed in situ by reaction of urethane prepolymers, such as isocyanate, di-isocyanate, and tri-isocyanate prepolymers, with a prepolymer containing an isocyanate reactive moiety. Suitable isocyanate reactive moieties include amines and polyols.

The selection of the polymer resin will depend, in part, on the rheology of the polymer resin. Rheology is the flow behavior of a polymer melt. For Newtonian fluids, the viscosity is a constant defined by the ratio between the shear stress (i.e., tangential stress, σ) and the shear rate (i.e., velocity gradient, dγ/dt). However, for non-Newtonian fluids, shear rate thickening (dilatent) or shear rate thinning (pseudo-plastic) may occur. In shear rate thinning cases, the viscosity decreases with increasing shear rate. It is this property that allows a polymer resin to be used in melt fabrication (e.g., extrusion, injection molding) processes. In order to identify the critical region of shear rate thinning, the rheology of the polymer resins must be determined. The rheology can be determined by a capillary technique in which the molten polymer resin is forced under a fixed pressure through a capillary of a particular length. By plotting the apparent shear rate versus viscosity at different temperatures, the relationship between the viscosity and temperature can be determined. The Rheology Processing Index (RPI) is a parameter that identifies the critical range of the polymer resin. The RPI is the ratio of the viscosity at a reference temperature to the viscosity after a change in temperature equal to 20° C. for a fixed shear rate. When the polymer resin is thermoplastic polyurethane, the RPI preferably is about 2 to about 10 (e.g., about 3 to about 8) when measured at a shear rate of about 150 l/s and a temperature of about 205° C.

Another polymer viscosity measurement is the Melt Flow Index (MFI) which records the amount of molten polymer (in grams) that is extruded from a capillary at a given temperature and pressure over a fixed amount of time. For example, when the polymer resin is thermoplastic polyurethane or polyurethane copolymer (e.g., a polycarbonate silicone-based copolymer, a polyurethane fluorine-based copolymers, or a polyurethane siloxane-segmented copolymer), the MFI preferably is about 20 or less (e.g., about 15 or less) over 10 minutes at a temperature of 210° C. and a load of 2160 g. When the polymer resin is an elastomeric polyolefin or a polyolefin copolymer (e.g., a copolymer comprising an ethylene α-olefin such as elastomeric or normal ethylene-propylene, ethlene-hexene, ethylene-octene, and the like, an elastomeric ethylene copolymer made from metallocene based catalysts, or a polypropylene-styrene copolymer), the MFI preferably is about 5 or less (e.g., about 4 or less) over 10 minutes at a temperature of 210° C. and a load of 2160 g. When the polymer resin is a nylon or polycarbonate, the MFI preferably is about 8 or less (e.g., about 5 or less) over 10 minutes at a temperature of 210° C. and a load of 2160 g.

The rheology of the polymer resin can depend on the molecular weight, polydispersity index (PDI), the degree of long-chain branching or cross-linking, glass transition temperature ($T_g$), and melt temperature ($T_m$) of the polymer resin. When the polymer resin is thermoplastic polyurethane or polyurethane copolymer (such as the copolymers described above), the weight average molecular weight ($M_w$) is typically about 50,000 g/mol to about 300,000 g/mol, preferably about 70,000 g/mol to about 150,000 g/mol, with a PDI of about 1.1 to about 6, preferably about 2 to about 4. Typically, the thermoplastic polyurethane has a glass transition temperature of about 20° C. to about 110° C. and a melt transition temperature of about 120° C. to about 250° C. When the polymer resin is an elastomeric polyolefin or a polyolefin copolymer (such as the copolymers described above), the weight average molecular weight ($M_w$) typically is about 50,000 g/mol to about 400,000 g/mol, preferably about 70,000 g/mol to about 300,000 g/mol, with a PDI of about 1.1 to about 12, preferably about 2 to about 10. When the polymer resin is nylon or polycarbonate, the weight average molecular weight ($M_w$) typically is about 50,000 g/mol to about 150,000 g/mol, preferably about 70,000 g/mol to about 100,000 g/mol, with a PDI of about 1.1 to about 5, preferably about 2 to about 4.

The polymer resin selected for the porous foam preferably has certain mechanical properties. For example, when the polymer resin is a thermoplastic polyurethane, the Flexural Modulus (ASTM D790) preferably is about 350 MPa (~50,000 psi) to about 1000 MPa (~150,000 psi), the average % compressibility is about 7 or less, the average % rebound is about 35 or greater, and the Shore D hardness (ASTM D2240-95) is about 40 to about 90 (e.g., about 50 to about 80).

In a third embodiment, the polishing pad comprises a porous foam comprising a thermoplastic polyurethane, wherein the porous foam has an average pore size of about 50 μm or less (e.g., about 40 μm or less, or about 25 μm or less) and wherein the thermoplastic polyurethane has a Melt Flow Index (MFI) of about 20 or less, an RPI of about 2 to about 10 (e.g., about 3 to about 8), and a molecular weight (MW) of about 50,000 g/mol to about 300,000 g/mol, with a PDI of about 1.1 to about 6 (e.g., about 2 to about 4). Preferably, the thermoplastic polyurethane has a Flexural Modulus of about 350 MPa (~50,000 psi) to about 1000 MPa (~150,000 psi), an average % compressibility of about 7 or less, an average % rebound of about 35 or greater, and a Shore D hardness of about 40 to about 90 (e.g., about 50 to about 80). Such a polishing pad can have one or more physical characteristics (e.g., pore size and polymer properties) described herein for the other embodiments of the invention.

In a fourth embodiment, the polishing pad is a polyurethane polishing pad comprising a polishing surface, which in the absence of any externally produced surface texture, can polish a silicon dioxide wafer with a polishing rate of at least about 600 Å/min with a carrier downforce pressure of about 0.028 MPa (4 psi), a slurry flow rate of about 100 ml/min, a platen rotation speed of about 60 rpm, and a carrier rotation speed of about 55 rpm to about 60 rpm. The polishing pad of the fourth embodiment does not contain abrasive particles suspended in the foam and is used in conjunction with a polishing composition (i.e., slurry) containing metal oxide particles, in particular, Semi-Sperse® D7300 polishing composition sold by Cabot Microelectronics Corporation. Typically, the polishing pad can polish a silicon dioxide wafer with a polishing rate of at least about 800 Å/min or even at least about 1000 Å/min using the polishing parameters recited above. The polishing pad has a void volume of about 25% or less and comprises pores having an average pore size of about 50 μm or less (e.g., about 40 μm or less). The polishing pad also can polish silicon dioxide blanket wafers such that the silicon dioxide blanket wafers have low non-uniformity values of only about 2% to about 4%. Such a polishing pad can have one or more physical characteristics (e.g., pore size and polymer properties) described herein for the other embodiments of the invention.

In a fifth embodiment, the polishing pad comprises a porous foam having a multi-modal distribution of pore sizes. The term "multi-modal" means that the porous foam has a pore size distribution comprising at least 2 or more (e.g., about 3 or more, about 5 or more, or even about 10 or more) pore size maxima. Typically the number of pore size maxima is about 20 or less (e.g., about 15 or less). A pore size maxima is defined as a peak in the pore size distribution whose area comprises about 5% or more by number of the total number of pores. Preferably, the pore size distribution is bimodal (i.e., has two pore size maxima).

The multi-modal pore size distribution can have pore size maxima at any suitable pore size values. For example, the multi-modal pore size distribution can have a first pore size maximum of about 50 μm or less (e.g., about 40 μm or less, about 30 μm or less, or about 20 μm or less) and a second pore size maximum of about 50 μm or more (e.g., about 70 μm or more, about 90 μm or more, or even about 120 μm or more). The multi-modal pore size distribution alternatively can have a first pore size maximum of about 20 μm or less (e.g., about 10 μm or less, or about 5 μm or less) and a second pore size maximum of about 20 μm or more (e.g., about 35 μm or more, about 50 μm or more, or even about 75 μm or more).

The porous foam of the fifth embodiment can comprise any suitable polymer resin, for example, the porous foam can comprise any of the polymer resins described herein. Preferably, the porous foam comprises a thermoplastic polyurethane. The polymer resin can have any of the physical, mechanical, or chemical properties described herein with respect to the other embodiments.

The porous foam of the polishing pads described herein optionally further comprises a water absorbent polymer. The water absorbent polymer desirably is selected from the group consisting of amorphous, crystalline, or cross-linked polyacrylamide, polyacrylic acid, polyvinylalcohol, salts thereof, and combinations thereof. Preferably, the water absorbent polymers are selected from the group consisting of cross-linked polyacrylamide, cross-linked polyacrylic acid, cross-linked polyvinylalcohol, and mixtures thereof. Such cross-linked polymers desirably are water-absorbent but will not melt or dissolve in common organic solvents. Rather, the water-absorbent polymers swell upon contact with water (e.g., the liquid carrier of a polishing composition).

The porous foam of the polishing pads described herein with respect to the first, second, third, and fifth embodiments optionally contains particles that are incorporated into the body of the pad. Preferably, the particles are dispersed throughout the porous foam. The particles can be abrasive particles, polymer particles, composite particles (e.g., encapsulated particles), organic particles, inorganic particles, clarifying particles, and mixtures thereof.

The abrasive particles can be of any suitable material, for example, the abrasive particles can comprise a metal oxide, such as a metal oxide selected from the group consisting of silica, alumina, ceria, zirconia, chromia, iron oxide, and combinations thereof, or a silicon carbide, boron nitride, diamond, garnet, or ceramic abrasive material. The abrasive particles can be hybrids of metal oxides and ceramics or hybrids of inorganic and organic materials. The particles also can be polymer particles many of which are described in U.S. Pat. No. 5,314,512, such as polystyrene particles, polymethylmethacrylate particles, liquid crystalline polymers (LCP, e.g., Vectra® polymers from Ciba Geigy), polyetheretherketones (PEEK's), particulate thermoplastic polymers (e.g., particulate thermoplastic polyurethane), particulate cross-linked polymers (e.g., particulate cross-linked polyurethane or polyepoxide), or a combination thereof. If the porous foam comprises a polymer resin, then the polymer particle desirably has a melting point that is higher than the melting point of the polymer resin of the porous foam. The composite particles can be any suitable particle containing a core and an outer coating. For example, the composite particles can contain a solid core (e.g., a metal oxide, metal, ceramic, or polymer) and a polymeric shell (e.g., polyurethane, nylon, or polyethylene). The clarifying particles can be phyllosilicates, (e.g., micas such as fluorinated micas, and clays such as talc, kaolinite, montmorillonite, hectorite), glass fibers, glass beads, diamond particles, carbon fibers, and the like.

The porous foam of the polishing pads described herein optionally contains soluble particles incorporated into the body of the pad. Preferably, the soluble particles are dispersed throughout the porous foam. Such soluble particles partially or completely dissolve in the liquid carrier of the polishing composition during chemical-mechanical polishing. Typically, the soluble particles are water-soluble particles. For example, the soluble particles can be any suitable water-soluble particles such as particles of materials selected from the group consisting of dextrins, cyclodextrins, mannitol, lactose, hydroxypropylcelluloses, methylcelluloses, starches, proteins, amorphous non-cross-linked polyvinyl alcohol, amorphous non-cross-linked polyvinyl pyrrolidone, polyacrylic acid, polyethylene oxide, water-soluble photosensitive resins, sulfonated polyisoprene, and sulfonated polyisoprene copolymer. The soluble particles also can be an inorganic water-soluble particles of materials selected from the group consisting of potassium acetate, potassium nitrate, potassium carbonate, potassium bicarbonate, potassium chloride, potassium bromide, potassium phosphate, magnesium nitrate, calcium carbonate, and sodium benzoate. When the soluble particles dissolve, the polishing pad can be left with open pores corresponding to the size of the soluble particle.

The particles preferably are blended with the polymer resin before being formed into a foamed polishing substrate. The particles that are incorporated into the polishing pad can be of any suitable dimension (e.g., diameter, length, or width) or shape (e.g., spherical, oblong) and can be incorporated into the polishing pad in any suitable amount. For example, the particles can have a particle dimension (e.g., diameter, length, or width) of about 1 nm or more and/or about 2 mm or less (e.g., about 0.5 $\mu$m to about 2 mm diameter). Preferably, the particles have a dimension of about 10 nm or more and/or about 500 $\mu$m or less (e.g., about 100 nm to about 10 $\mu$m diameter). The particles also can be covalently bound to the polymer resin of the porous foam.

The porous foam of the polishing pads described herein optionally contains solid catalysts that are incorporated into the body of the pad. Preferably, the solid catalysts are dispersed throughout the porous foam. The catalyst can be metallic, non-metallic, or a combination thereof. Preferably, the catalyst is chosen from metal compounds that have multiple oxidation states, such as but not limited to metal compounds comprising Ag, Co, Ce, Cr, Cu, Fe, Mo, Mn, Nb, Ni, Os, Pd, Ru, Sn, Ti, and V.

The porous foam of the polishing pads described herein optionally contains chelating agents or oxidizing agents. Preferably, the chelating agents and oxidizing agents are dispersed throughout the porous foam. The chelating agents can be any suitable chelating agents. For example, the chelating agents can be carboxylic acids, dicarboxylic acids, phosphonic acids, polymeric chelating agents, salts thereof, and the like. The oxidizing agents can be oxidizing salts or oxidizing metal complexes including iron salts, aluminum salts, peroxides, chlorates, perchlorates, permanganates, persulfates, and the like.

The polishing pads described herein have a polishing surface which optionally further comprises grooves, channels, and/or perforations which facilitate the lateral transport of polishing compositions across the surface of the polishing pad. Such grooves, channels, or perforations can be in any suitable pattern and can have any suitable depth and width. The polishing pad can have two or more different groove patterns, for example a combination of large grooves and small grooves as described in U.S. Pat. No. 5,489,233. The grooves can be in the form of slanted grooves, concentric grooves, spiral or circular grooves, XY crosshatch pattern, and can be continuous or non-continuous in connectivity. Preferably, the polishing pad comprises at least small grooves produced by standard pad conditioning methods.

The polishing pads described herein have a polishing surface which optionally further comprises regions of different density, porosity, hardness, modulus, and/or compressibility. The different regions can have any suitable shape or dimension. Typically, the regions of contrasting density, porosity, hardness, and/or compressibility are formed on the polishing pad by an ex situ process (i.e., after the polishing pad is formed).

The polishing pads described herein optionally further comprise one or more apertures, transparent regions, or translucent regions (e.g., windows as described in U.S. Pat. No. 5,893,796). The inclusion of such apertures or translucent regions is desirable when the polishing pad is to be used in conjunction with an in situ CMP process monitoring technique. The aperture can have any suitable shape and may be used in combination with drainage channels for minimizing or eliminating excess polishing composition on the polishing surface. The translucent region or window can be any suitable window, many of which are known in the art. For example, the translucent region can comprise a glass or polymer-based plug that is inserted in an aperture of the polishing pad or may comprise the same polymeric material used in the remainder of the polishing pad.

The polishing pads of the invention can be produced using any suitable technique, many of which are known in the art. For example, the polishing pads can be produced by (a) a mucell process, (b) a phase inversion process, (c) a spinodal or bimodal decomposition process, or (d) a pressurized gas injection process. Preferably, the polishing pads are produced using the mucell process or the pressurized gas injection process.

The mucell process involves (a) combining a polymer resin with a supercritical gas to produce a single-phase solution and (b) forming a polishing pad substrate of the invention from the single-phase solution. The polymer resin can be any of the polymer resins described above. The supercritical gas is generated by subjecting a gas to an elevated temperature and pressure sufficient to create a supercritical state in which the gas behaves like a fluid (i.e., a supercritical fluid, SCF). The gas can be a hydrocarbon, chlorofluorocarbon, hydrochlorofluorocarbon (e.g., freon), nitrogen, carbon dioxide, carbon monoxide, or a combination thereof. Preferably, the gas is a non-flammable gas, for example a gas that does not contain C—H bonds. More preferably, the gas is nitrogen, carbon dioxide, or a combination thereof. Most preferably, the gas comprises, or is, carbon dioxide. The gas can be converted to the supercritical gas before or after combination with the polymer resin. Preferably, the gas is converted to the supercritical gas before combination with the polymer resin. Typically, the gas is subjected to a temperature of about 100° C. to about 300° C. and a pressure of about 5 MPa (~800 psi) to about 40 MPa (~6000 psi). When the gas is carbon dioxide, the temperature is about 150° C. to about 250° C., and the pressure is about 7 MPa (~1000 psi) to about 35 MPa (~5000 psi) (e.g., about 19 MPa (~2800 psi) to about 26 MPa (~3800 psi)).

The single-phase solution of the polymer resin and the supercritical gas can be prepared in any suitable manner. For example, the supercritical gas can be blended with molten polymer resin in a machine barrel to form the single-phase solution. The single-phase solution then can be injected into a mold, where the gas expands to form a pore structure with high uniformity of pore size within the molten polymer resin. The concentration of the supercritical gas in the single-phase solution typically is about 0.01% to about 5% (e.g., about 0.1% to about 3%) of the total volume of the single-phase solution. The concentration of the supercritical fluid will determine the density of the porous foam and the pore size. As the concentration of the supercritical gas is increased, the density of the resulting porous foam increases and the average pore size decreases. The concentration of the supercritical gas also can affect the ratio of open cells to closed cells in the resulting porous foam. These and additional process features are described in further detail in U.S. Pat. No. 6,284,810.

The polishing pad is formed by creating a thermodynamic instability in the single-phase solution sufficient to produce greater than about $10^5$ nucleation sites per cm$^3$, of the solution. The thermodynamic instability can result from, for example, a rapid change in temperature, a rapid drop in pressure, or a combination thereof. Typically, the thermodynamic instability is induced at the exit of the mold or die which contains the single-phase solution. Nucleation sites are the sites at which the dissolved molecules of the supercritical gas form clusters from which the cells in the porous foam grow. The number of nucleation sites is determined by assuming that the number of nucleation sites is approximately equal to the number of cells formed in the polymer foam. The polishing pad can be formed from the single-phase solution by any suitable technique. For example, the polishing pad can be formed using a technique selected from the group consisting of extrusion into a polymer sheet, co-extrusion of multilayer sheets, injection molding, compression molding, blow molding, blown film, multilayer blown film, cast film, thermoforming, and lamination. Preferably, the polishing pad is formed by extrusion into a polymer sheet or by injection molding.

The phase inversion process involves the dispersion of extremely fine particles of a polymer resin that have been heated above the $T_m$ or $T_g$ of the polymer in a highly agitated non-solvent (e.g., give examples here). The polymer resin can be any of the polymer resins described above. As the number of fine polymer resin particles added to the non-solvent increases, the fine polymer resin particles connect to form initially as tendrils and ultimately as a three-dimensional polymer network. The non-solvent mixture is then cooled causing the non-solvent to form into discrete droplets within the three-dimensional polymer network. The resulting material is a polymer foam having sub-micron pore sizes.

The spinodal or binodal decomposition process involves controlling the temperature and/or volume fraction of a polymer-polymer mixture, or a polymer-solvent mixture, so as to move the mixture from a single-phase region into a two-phase region. Within the two-phase region, either spinodal decomposition or binodal decomposition of the polymer mixture can occur. Decomposition refers to the process by which a polymer mixture changes from a nonequilibrium phase to an equilibrium phase. In the spinodal region, the free energy of mixing curve is negative such that phase separation of the polymers (i.e., formation of a two-phase material), or phase separation of the polymer and the solvent, is spontaneous in response to small fluctuations in the volume fraction. In the binodal region, the polymer mixture is stable with respect to small fluctuations in volume fraction and thus requires nucleation and growth to achieve a phase-separated material. Precipitation of the polymer mixture at a temperature and volume fraction within the two-phase region (i.e., the binodal or spinodal region) results in the formation of a polymer material having two phases. If the polymer mixture is laden with a solvent or a gas, the biphasic polymer material will contain sub-micron pores at the interface of the phase-separation. The polymers preferably comprise the polymer resins described above.

The pressurized gas injection process involves the use of high temperatures and pressures to force a supercritical fluid gas into a solid polymer sheet comprising an amorphous polymer resin. The polymer resin can be any of the polymer resins described above. Solid extruded sheets are placed at room temperature into a pressure vessel. A supercritical gas (e.g., $N_2$ or $CO_2$) is added to the vessel, and the vessel is pressurized to a level sufficient to force an appropriate amount of the gas into the free volume of the polymer sheet. The amount of gas dissolved in the polymer is directly proportional to the applied pressure according to Henry's law. Increasing the temperature of the polymer sheet increases the rate of diffusion of the gas into the polymer, but also decreases the amount of gas that can dissolve in the polymer sheet. Once the gas has thoroughly saturated the polymer, the sheet is removed from the pressurized vessel. If desired, the polymer sheet can be quickly heated to a softened or molten state if necessary to promote cell nucleation and growth. U.S. Pat. Nos. 5,182,307 and 5,684,055 describe these and additional features of the pressurized gas injection process.

The polishing pads of the invention are particularly suited for use in conjunction with a chemical-mechanical polishing (CMP) apparatus. Typically, the apparatus comprises a platen, which, when in use, is in motion and has a velocity that results from orbital, linear, or circular motion, a polishing pad of the invention in contact with the platen and moving with the platen when in motion, and a carrier that holds a substrate to be polished by contacting and moving relative to he surface of the polishing pad intended to contact a substrate to be polished. The polishing of the substrate takes place by the substrate being placed in contact with the polishing pad and then the polishing pad moving relative to the substrate, typically with a polishing composition therebetween, so as to abrade at least a portion of the substrate to polish the substrate. The CMP apparatus can be any suitable CMP apparatus, many of which are known in the art. The polishing pad of the invention also can be used with linear polishing tools.

The polishing pads described herein can be used alone or optionally can be used as one layer of a multi-layer stacked polishing pad. For example, the polishing pads can be used in combination with a subpad. The subpad can be any suitable subpad. Suitable subpads include polyurethane foam subpads (e.g., Poron® foam subpads from Rogers Corporation), impregnated felt subpads, microporous polyurethane subpads, or sintered urethane subpads. The subpad typically is softer than the polishing pad of the invention and therefore is more compressible and has a lower Shore hardness value than the polishing pad of the invention. For example, the subpad can have a Shore A hardness of about 35 to about 50. In some embodiments, the subpad is harder, is less compressible, and has a higher Shore hardness than the polishing pad. The subpad optionally comprises grooves, channels, hollow sections, windows, aperatures, and the like. When the polishing pads of the invention are used in combination with a subpad, typically there is an intermediate backing layer such as a polyethyleneterephthalate film, coextensive with and inbetween the polishing pad and the subpad. Alternatively, the porous foam of the invention also can be used as a subpad in conjunction with a conventional polishing pad.

The polishing pads described herein are suitable for use in polishing many types of substrates and substrate materials. For example, the polishing pads can be used to polish a variety of substrates including memory storage devices, semiconductor substrates, and glass substrates. Suitable substrates for polishing with the polishing pads include memory disks, rigid disks, magnetic heads, MEMS devices, semiconductor wafers, field emission displays, and other microelectronic substrates, especially substrates comprising insulating layers (e.g., silicon dioxide, silicon nitride, or low dielectric materials) and/or metal-containing layers (e.g., copper, tantalum, tungsten, aluminum, nickel, titanium, platinum, ruthenium, rhodium, iridium or other noble metals).

The following examples further illustrate the invention but, of course, should not be construed as in any way limiting its scope.

EXAMPLE 1

This example illustrates a method for producing microporous foam rods having a uniform pore size.

Thermoplastic polyurethane (TPU) foam rods (1A and 1B) were produced by an extrusion method. Each TPU foam rod was prepared using TPU (TT 1072 Tecothane® polyurethane, Thermedics Polymer Products) having a weight average molecular weight of 90,000 g/mol to 110,000 g/mol with a PDI of 2.2 to 3.3. In each case, the TPU was placed in an extruder (Labex II primary, 6.35 cm (2.5 inch) diameter 32/1 L/D single screw extruder) at elevated temperature and pressure to form a polymer melt. Carbon dioxide gas was injected into the polymer melt (using a Trexel TR30-5000G delivery system equipped with P7 trim and 4 standard injectors) under the elevated temperature and pressure resulting in formation of a supercritical fluid $CO_2$ that blended with the polymer melt to form a single-phase solution. The $CO_2$/polymer solution was extruded through a converging die (0.15 cm (0.060 inch) diameter, 12.1° angle) to form a porous foam rod. The concentration of $CO_2$ was 1.51% and 1.26% for rods 1A and 1B, respectively.

The temperatures for each zone of the extruder, the gate, die and melt temperatures, die pressure, screw speed, and concentration of $CO_2$ are summarized in Table 1. A scanning electron microscopy (SEM) image for Rod Sample 1B is shown in FIG. 1.

TABLE 1

| Extrusion Parameters | Rod 1A | Rod 1B |
| --- | --- | --- |
| Zone 1 Temperature (° C.) | 210 (410° F.) | 210 (410° F.) |
| Zone 2 Temperature (° C.) | 221 (430° F.) | 221 (430° F.) |
| Zone 3 Temperature (° C.) | 221 (430° F.) | 218 (425° F.) |
| Zone 4 Temperature (° C.) | 216 (420° F.) | 204 (400° F.) |
| Zone 5 Temperature (° C.) | 216 (420° F.) | 204 (400° F.) |
| Gate Temperature (° C.) | 227 (440° F.) | 218 (425° F.) |
| Die Temperature (° C.) | 227 (440° F.) | 218 (425° F.) |
| Melt Temperature (° C.) | 219 (427° F.) | 212 (414° F.) |
| Die Pressure P1 (MPa) | 25.7 (3730 psi) | 24.5 (3560 psi) |
| Die Pressure P2 (MPa) | 20.7 (3010 psi) | 21.2 (3080 psi) |
| Die Pressure P3 (MPa) | 19.7 (2860 psi) | 20.3 (2940 psi) |
| Die Pressure P4 (MPa) | 19.8 (2880 psi) | 20.3 (2940 psi) |
| Screw Speed (rpm) | 14 | 13 |
| Drive Amp (amp) | 63 | 64 |
| SCF Type | $CO_2$ | $CO_2$ |
| SCF set (kg/hr) | 0.40 (0.87 lb/hr) | 0.32 (0.70 lb/hr) |
| Output (kg/hr) | 26.3 (57.8 lb/hr) | 25.3 (55.7 lb/hr) |
| SCF Concentration (%) | 1.51 | 1.26 |

This example illustrates that microporous foam materials having uniform cell sizes can be produced using supercritical fluid microcell technology.

EXAMPLE 2

This example illustrates a method for preparing polishing pads of the invention.

A series of thermoplastic polyurethane (TPU) foam sheets (2A, 2B, 2C, and 2D) were produced by an extrusion method. Each TPU sheet was prepared using TPU (TT 1072 Tecothane® polyurethane, Thermedics Polymer Products) having a weight average molecular weight of 90,000 g/mol to 110,000 g/mol with a PDI of 2.2 to 3.3. In each case, the TPU was placed in an extruder (Labex II primary, 6.35 cm (2.5 inch) diameter 32/1 L/D single screw) at elevated temperature and pressure to form a polymer melt. Carbon dioxide gas was injected into the polymer melt under the elevated temperature and pressure resulting in formation of a supercritical fluid $CO_2$ that blended with the polymer melt to form a single-phase solution. The $CO_2$/polymer solution was extruded through a flat die (30.5 cm (12 inch) wide, 0.005–0.0036 cm (0.002–0.0014 inch) flex gap, 6° converging) to form a porous foam sheet. The concentration of $CO_2$ was 0.50%, 0.80%, 1.70%, and 1.95% for sheets 2A, 2B, 2C, and 2D, respectively.

The temperatures for each zone of the extruder, the gate, die and melt temperatures, die pressure, screw speed, concentration of $CO_2$, and sheet dimensions are summarized in Table 2.

TABLE 2

| Extrusion Parameters | Sheet 2A | Sheet 2B | Sheet 2C | Sheet 2D |
| --- | --- | --- | --- | --- |
| Zone 1 Temperature (° C.) | 210 (410° F.) | 210 (410° F.) | 210 (410° F.) | 210 (410° F.) |
| Zone 2 Temperature (° C.) | 221 (430° F.) | 221 (430° F.) | 221 (430° F.) | 221 (430° F.) |
| Zone 3 Temperature (° C.) | 221 (430° F.) | 221 (430° F.) | 213 (415° F.) | 213 (415° F.) |
| Zone 4 Temperature (° C.) | 216 (420° F.) | 216 (420° F.) | 190 (375° F.) | 190 (375° F.) |
| Zone 5 Temperature (° C.) | 216 (420° F.) | 216 (420° F.) | 190 (375° F.) | 190 (375° F.) |
| Gate Temperature (° C.) | 216 (420° F.) | 216 (420° F.) | 204 (400° F.) | 204 (400° F.) |
| Die Temperature (° C.) | 213 (415° F.) | 213 (415° F.) | 196 (385° F.) | 196 (385° F.) |

TABLE 2-continued

| Extrusion Parameters | Sheet 2A | Sheet 2B | Sheet 2C | Sheet 2D |
|---|---|---|---|---|
| Melt Temperature (° C.) | 213 (415° F.) | 213 (415° F.) | 210 (410° F.) | 210 (410° F.) |
| Die Pressure (MPa) | 14.7 (2130 psi) | 14.2 (2060 psi) | 14.5 (2100 psi) | 14.3 (2070 psi) |
| Screw Speed (rpm) | 13 | 13 | 13 | 13 |
| SCF Type | $CO_2$ | $CO_2$ | $CO_2$ | $CO_2$ |
| SCF set (kg/hr) | 0.136 (0.30 lb/hr) | 0.218 (0.48 lb/hr) | 0.454 (1.00 lb/hr) | 0.513 (1.13 lb/hr) |
| Output (kg/hr) | 27.2 (60.0 lb/hr) | 27.2 (60.0 lb/hr) | 26.3 (58.0 lb/hr) | 26.3 (58.0 lb/hr) |
| SCF Concentration (%) | 0.50 | 0.80 | 1.70 | 1.95 |
| Sheet Width (cm) | 26.7 (10.5 in) | 26.7 (10.5 in) | 25.4 (10 in) | 27.3 (10.75 in) |
| Sheet Thickness (cm) | 0.0635 (25 mil) | 0.0711 (28 mil) | 0.108 (42.5 mil) | 0.108 (42.5 mil) |
| Cell size | large | large and small | small | small |

Porous TPU foam sheets having good uniformity of cell size (±25 μm) were produced using each series of the extrusion parameters shown in Table 2. Samples 2A and 2B had large average cell sizes (>100 μm). Sheets 2C and 2D had small average cell sizes (<100 μm).

This example demonstrates that porous foam sheets having small cell sizes can be produced by the supercritical fluid method.

EXAMPLE 3

This example illustrates a method for preparing polishing pads of the invention.

A series of thermoplastic polyurethane (TPU) foam sheets (3A, 3B, 3C, and 3D) were produced by an extrusion method. Each TPU sheet was prepared using TPU (TT 1072 Tecothane® polyurethane, Thermedics Polymer Products) having a weight average molecular weight of 90,000 g/mol to 110,000 g/mol with a PDI of 2.2 to 3.3. In each case, the TPU was placed in an extruder (Labex II primary, 6.35 cm (2.5 inch) diameter 32/1 L/D single screw) at elevated temperature and pressure to form a polymer melt. Carbon dioxide gas was injected into the polymer melt under the elevated temperature and pressure resulting in formation of a supercritical fluid $CO_2$ that blended with the polymer melt to form a single-phase solution. The $CO_2$/polymer solution was extruded through a flat die (30.5 cm (12 inch) wide, 0.005–0.0036 cm (0.002–0.0014 inch) flex gap, 6° converging) to form a porous foam sheet. The concentration of $CO_2$ was 1.38%, 1.50%, 1.66%, and 2.05% for sheets 3A, 3B, 3C, and 3D, respectively.

Figure 2:
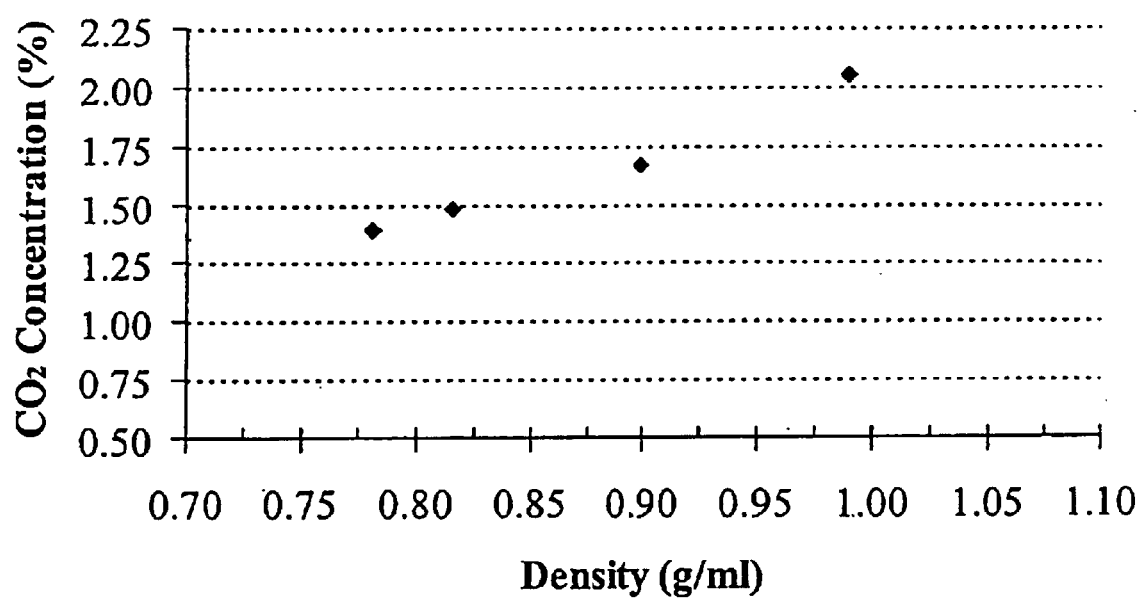
FIG. 2 is a plot of carbon dioxide concentration versus density illustrating the relationship between the concentration of $CO_2$ in a single-phase solution of polymer resin and the density of the resulting porous foam prepared therefrom.

The temperatures for each zone of the extruder, the gate, die, and melt temperatures; die pressures, screw speed, and concentration of $CO_2$ are summarized in Table 3. The average cell size produced in the porous TPU foam sheets depends on the concentration of the $CO_2$ gas. A plot of the $CO_2$ concentration in the single-phase solution versus the density of the resulting sheets is shown in FIG. 2.

TABLE 3

| Extrusion Parameters | Sheet 3A | Sheet 3B | Sheet 3C | Sheet 3D |
|---|---|---|---|---|
| Zone 1 Temperature (° C.) | 214 (418° F.) | 210 (410° F.) | 210 (410° F.) | 210 (410° F.) |
| Zone 2 Temperature (° C.) | 221 (430° F.) | 221 (430° F.) | 221 (430° F.) | 221 (430° F.) |
| Zone 3 Temperature (° C.) | 213 (415° F.) | 213 (415° F.) | 213 (415° F.) | 213 (415° F.) |
| Zone 4 Temperature (° C.) | 193 (380° F.) | 190 (375° F.) | 190 (375° F.) | 179 (355° F.) |
| Zone 5 Temperature (° C.) | 193 (380° F.) | 190 (375° F.) | 190 (375° F.) | 179 (355° F.) |
| Gate Temperature (° C.) | 199 (390° F.) | 193 (380° F.) | 193 (380° F.) | 185 (365° F.) |
| Die 1 Temperature (° C.) | 199 (390° F.) | 196 (385° F.) | 196 (385° F.) | 190 (375° F.) |
| Die 2 Temperature (° C.) | 216 (420° F.) | 210 (410° F.) | 210 (410° F.) | 199 (390° F.) |
| Melt Temperature (° C.) | 210 (410° F.) | 204 (400° F.) | 202 (395° F.) | 196 (385° F.) |
| Die Pressure P1 (MPa) | 17.1 (2480 psi) | 18.1 (2630 psi) | 20.9 (3030 psi) | 24.4 (3540 psi) |
| Die Pressure P2 (MPa) | 15.9 (2300 psi) | 15.9 (2310 psi) | 16.7 (2420 psi) | 20.2 (2930 psi) |
| Die Pressure P3 (MPa) | 13.4 (1950 psi) | 14.3 (2070 psi) | 15.4 (2230 psi) | 18.6 (2700 psi) |
| Die Pressure P4 (MPa) | 12.9 (1870 psi) | 13.8 (2000 psi) | 14.7 (2130 psi) | 17.7 (2570 psi) |
| Screw Speed (rpm) | 13 | 13 | 13 | 13 |
| Drive Amp (amp) | — | — | 69 | 67 |
| SCF Type | $CO_2$ | $CO_2$ | $CO_2$ | $CO_2$ |
| SCF set (kg/hr) | 0.363 (0.80 lb/hr) | 0.399 (0.88 lb/hr) | 0.454 (1.00 lb/hr) | 0.513 (1.13 lb/hr) |
| Output (kg/hr) | 26.3 (58 lb/hr) | 26.3 (58 lb/hr) | 27.3 (60.2 lb/hr) | 25.0 (55.1 lb/hr) |
| SCF Concentration (%) | 1.38 | 1.50 | 1.66 | 2.05 |
| Foam Sheet Width (cm) | 27.9 (11.00 in) | 28.6 (11.25 in) | 27.9 (11.00 in) | 27.3 (10.75 in) |

TABLE 3-continued

| Extrusion Parameters | Sheet 3A | Sheet 3B | Sheet 3C | Sheet 3D |
|---|---|---|---|---|
| Foam Sheet Thickness (cm) | 0.100 (0.0395 in) | 0.104 (0.0410 in) | 0.103 (0.0407 in) | 0.100 (0.0395 in) |
| Density (g/ml) | 0.781 | 0.816 | 0.899 | 0.989 |

Figure 3:
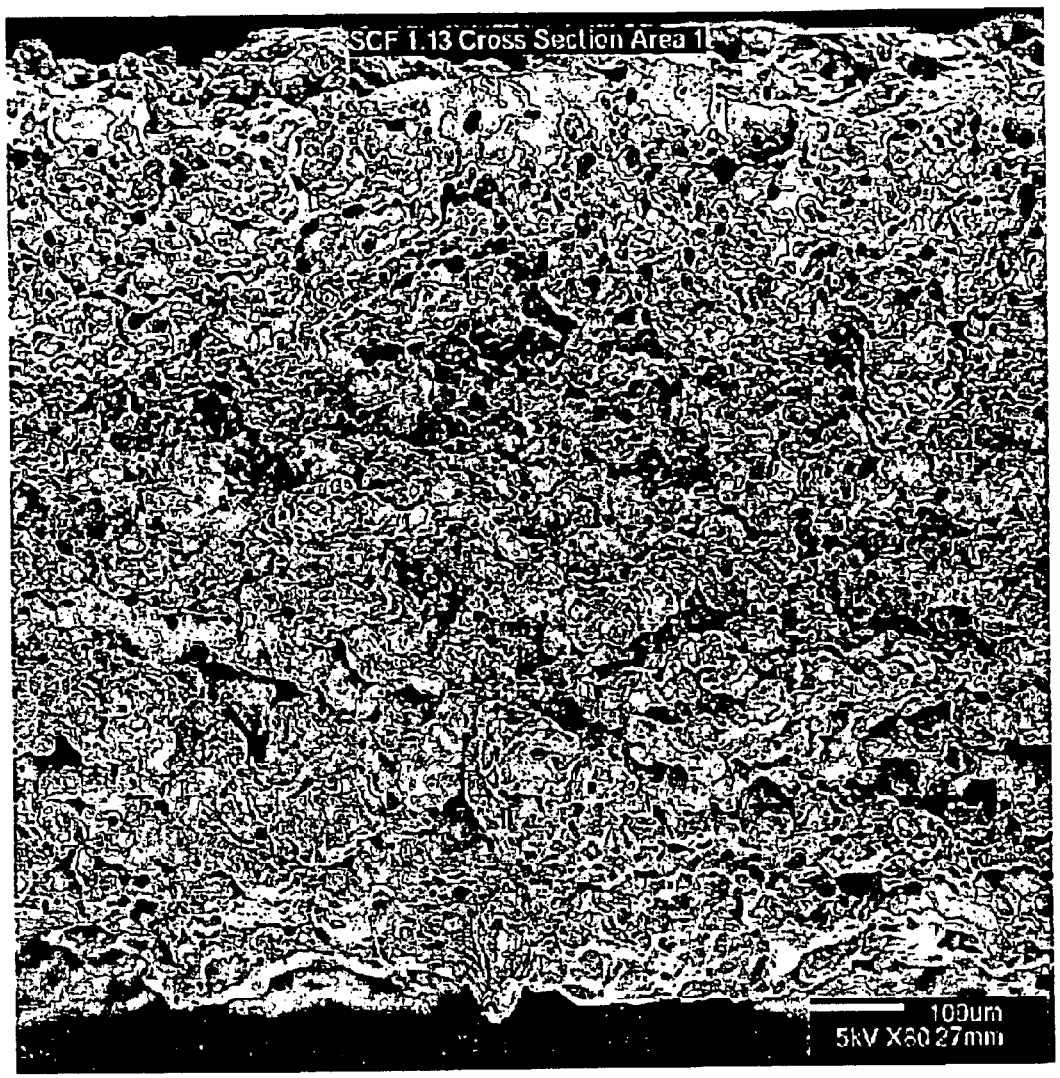
FIG. 3 is a scanning electron microscopy (SEM) image (80× magnification) of a cross-section of an extruded porous foam sheet having an average pore size of 8 μm, a density of 0.989 g/cm³, and a cell density of greater than $10^6$ cells per cm³.
Figure 4:
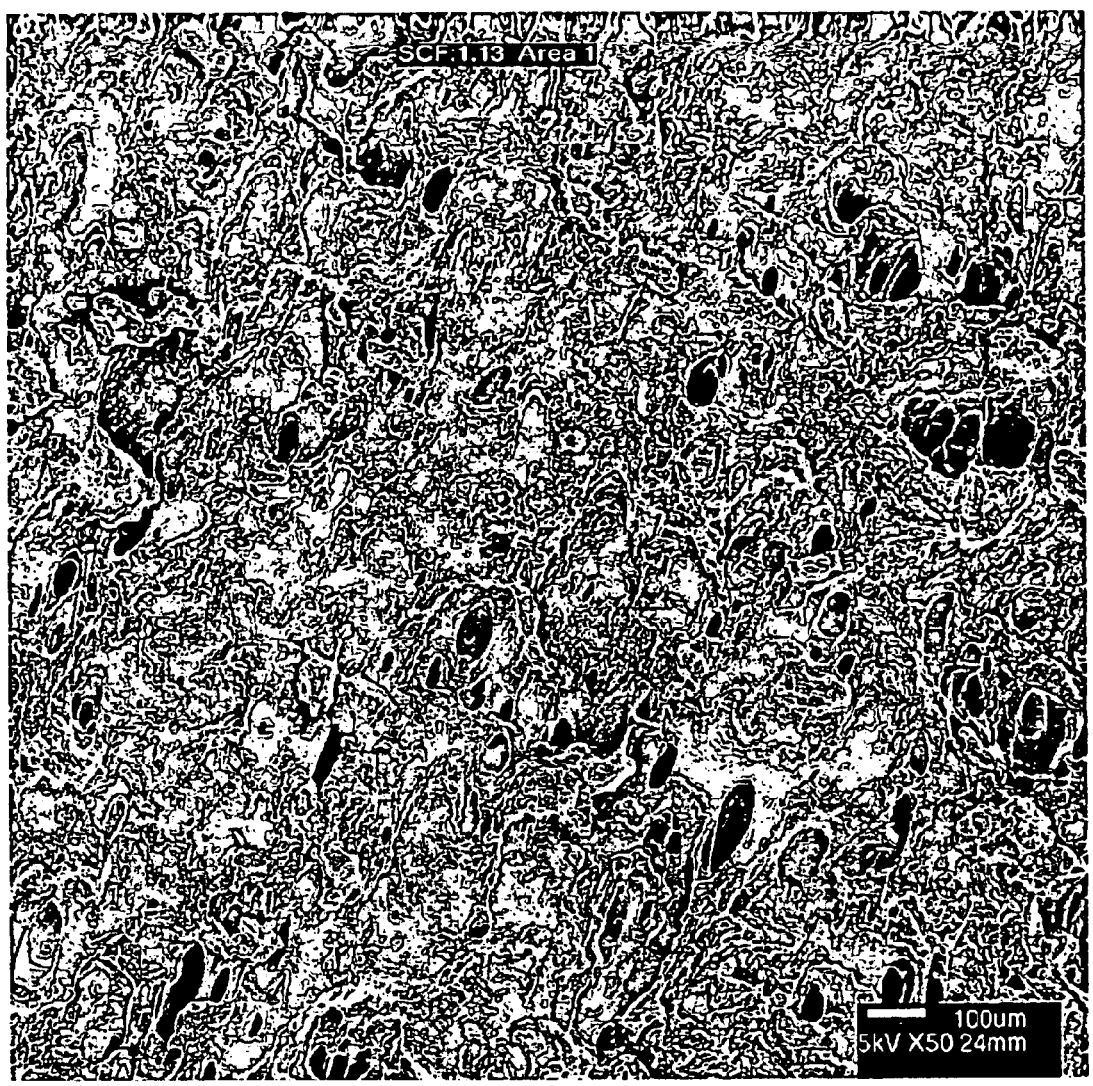
FIG. 4 is a scanning electron microscopy (SEM) image (50× magnification) of the top surface of an extruded porous foam sheet having an average pore size of 15 μm, an density of 0.989 g/cm³, a cell density of greater than $10^6$ cells per cm³, and no surface macrotexture.

Porous TPU foam sheets having good uniformity of cell size were produced using each series of the extrusion parameters shown in Table 3. Scanning electron microscopy (SEM) images of Sample 3D are shown in FIG. 3 (cross-section) and 4 (top surface). The physical properties of Sample 3D were determined, and the data are summarized in Table 4.

The polishing pad density was determined in accordance with the ASTM D795 test method. The Shore A hardness of the polishing pad was determined in accordance with the ASTM 2240 test method. The peak stress of the polishing pad was determined in accordance with the ASTM D638 test method. The % compressibility was determined at 0.031 MPa (4.5 psi) pressure using an Ames meter. The probe of the Ames tester was first zeroed (without the sample), and then the sample thickness was measured (D1). A 5-pound weight (0.031 MPa) was placed on the probe and the sample thickness was measured after 1 minute (D2). The compressibility is the ratio of the difference in thickness (D1–D2) to the initial sample thickness (D1). The % compressibility was also measured using an Instron technique at a pressure of 0.5 MPa (72 psi). The % rebound was determined using a Shore Resiliometer (Shore Instrument & MFG). The % rebound was measured in the height of the travel of a metal slug as it rebounds off the specimen preformed at 0.031 MPa (4.5 psi). The % rebound is reported as an average over 5 measurements. The flexural modulus was determined in accordance with the ASTM D790 test method. The air permeability was determined using a Genuine Gurley 4340 Automatic Densometer.

The $T_g$ was determined either by Dynamic Mechanical Analyzer (DMA) or by Thermomechanical Analysis (TMA). For DMA, a TA 2980 model instrument was used at an operating temperature of –25° C. to 130° C., a frequency of 3 Hz, and a heating rate of 2.5° C./min. The $T_g$ was calculated from the midpoint of the storage modulus versus temperature plot. For TMA, the test was performed in accordance with the ASTM E831 test method. The $T_m$ was determined by Differential Scanning Colorimetry (DSC). A TA 2920 model instrument was used at an operating temperature of –50° C. to 230° C. and a heating rate of 10° C./min. The $T_m$ value was calculated form the peak melting point of the exothermic wave. The Storage Modulus was determined by DMA at 25° C. The Taber Wear is the amount of the porous foam sheet that is removed in 1000 cycles of polishing. The average pore size and pore density of the porous foam sheets were determined using SEM micrographs at 50× and 100× magnification.

The average pore size and pore size distribution were measured by counting closed cell pores in a given unit area and then averaging the pore diameters using the imaging software, Clemex Vision software available from Clemex Technologies. The size and percentages for the pores are reported with respect to both width and length reflecting the non-spherical nature of the pores in the sample. The pore density was determined by the following formula:

$$\text{Number of cells/cm}^3 = \left(\frac{\rho_{solid}}{\rho_{pad\ material}} - 1\right) * \left(\frac{6}{\pi d^3}\right)$$

where $\rho_{solid}$ is the density of the solid thermoplastic polyurethane pads (without SCF gas) equal to 1.2 g/cm³, $\rho_{pad\ material}$ is the density of the microcellular thermoplastic polyurethane pads (with SCF gas), and d is the diameter of the cell (in cm, assumed to be spherical).

TABLE 4

| Physical Property | Value |
|---|---|
| Thickness | 0.107 cm (0.042 in) |
| Density | 0.989 g/cm³ |
| Shore A Hardness | 93.7 |
| Peak Stress | 20.1 MPa (2911.8 psi) |
| Average Pore Size (w × l) | 7.9 µm ± 12.1 µm × 13.2 µm ± 20.6 µm |
| % Pores with Size 0–10 µm (w, l) | 78.4, 61.2 |
| % Pores with Size 10–20 µm (w, l) | 92.7, 84.7 |
| % Pores with Size 20–30 µm (w, l) | 96.8, 91.3 |
| % Pores with Size ±20 µm Average (w, l) | 96, 91 |
| Number of Cells per cm³ | 47 × 10⁶ |
| % Compressibility @ 0.031 MPa (4.5 psi) | 3.99% |
| % Rebound @ 0.031 MPa (4.5 psi) | 46.11% |
| Flexural Modulus | 538 MPa (78,000 psi) |
| Roughness | 14.66 µm |
| Air Permeability | 225.77 s |
| $T_g$ (DMA) | 44.29° C. |
| $T_m$ (DSC) | 80° C.–205° C. |
| Storage Modulus @ 25° C. (DMA) | 1000 MPa |
| Taber Wear | 71.65 mg/1000 cycles |

The average pore size and pore size distribution of the porous foam of Sample 3D were also determined after the sample was conditioned with a silicon oxide block for 5 hours. The values for the average pore size and the percentage of pore having a dimension within ±20 mm of the average (7.7±9.3×13.2±15.5 (w×l) and 98%/91% (w/l), respectively) were substantially the same as the values obtained prior to conditioning and abrasion. These results indicate that the pore size and pore size distribution was consistent through the cross-sectional area of the porous foam sheet.

This example demonstrates that microporous polishing pads having a uniform pore size can be prepared using the method of the invention.

EXAMPLE 4

This example illustrates that microporous foam polishing pads of the invention have good polishing properties.

Figure 5:
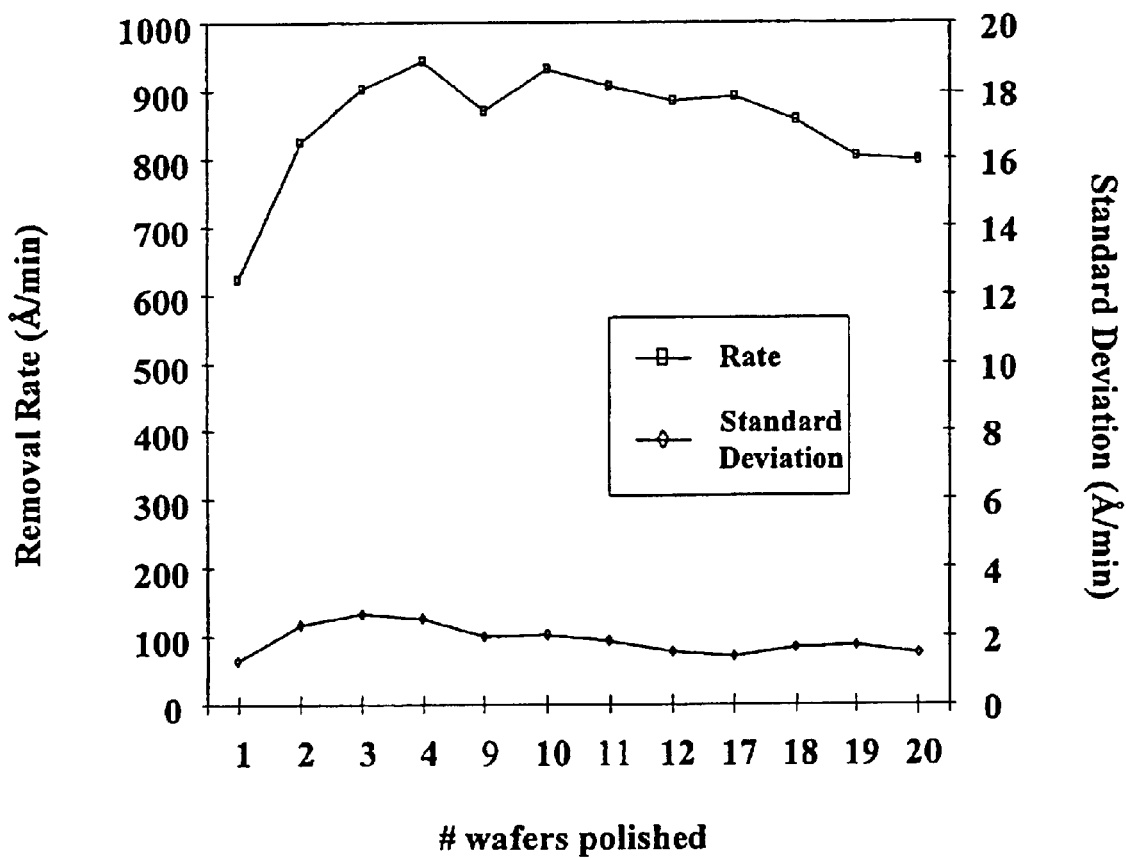
FIG. 5 is a plot of silicon dioxide removal rate versus the number of silicon dioxide wafers polished using a microporous foam polishing pad of the invention.

A microporous foam polyurethane polishing pad produced according to the method recited in Example 3 for Sample 3D, having a density of 0.989 g/ml and a thickness of 0.107 cm (0.0423 in), was used to chemically-mechanically polish blanket silicon dioxide wafers. The polishing pad was used without any conditioning (i.e., formation of microgrooves or microstructure), buffing, or external macrogrooves (i.e., macrotexture). The removal rate and within wafer non-uniformity was determined for the polishing pad as a function of the number of silicon dioxide wafers that were polished. The removal rates were measured for four wafers in a row followed by polishing of four "dummy" silicon dioxide wafers, for which removal rates were not recorded. A plot of removal rate versus the number of silicon dioxide wafers polished is shown in FIG. 5. The polishing parameters were carrier downforce pressure of 0.028 MPa (4 psi), a slurry flow rate of 100 m/min, a platen speed of 60 rpm, a carrier speed of 55–60 rpm.

The data depicted in FIG. 5 shows that polishing pads comprising a microporous foam having a uniform cell size distribution produce substantial polishing removal rates of silicon dioxide blanket wafers, even in the absence of any conditioning, buffing, or groove macrotexture. Moreover, the polishing pads produce very low within wafer non-uniformity.

EXAMPLE 5

This example illustrates that microporous foam polishing pads of the invention have good polishing properties.

Figure 6:
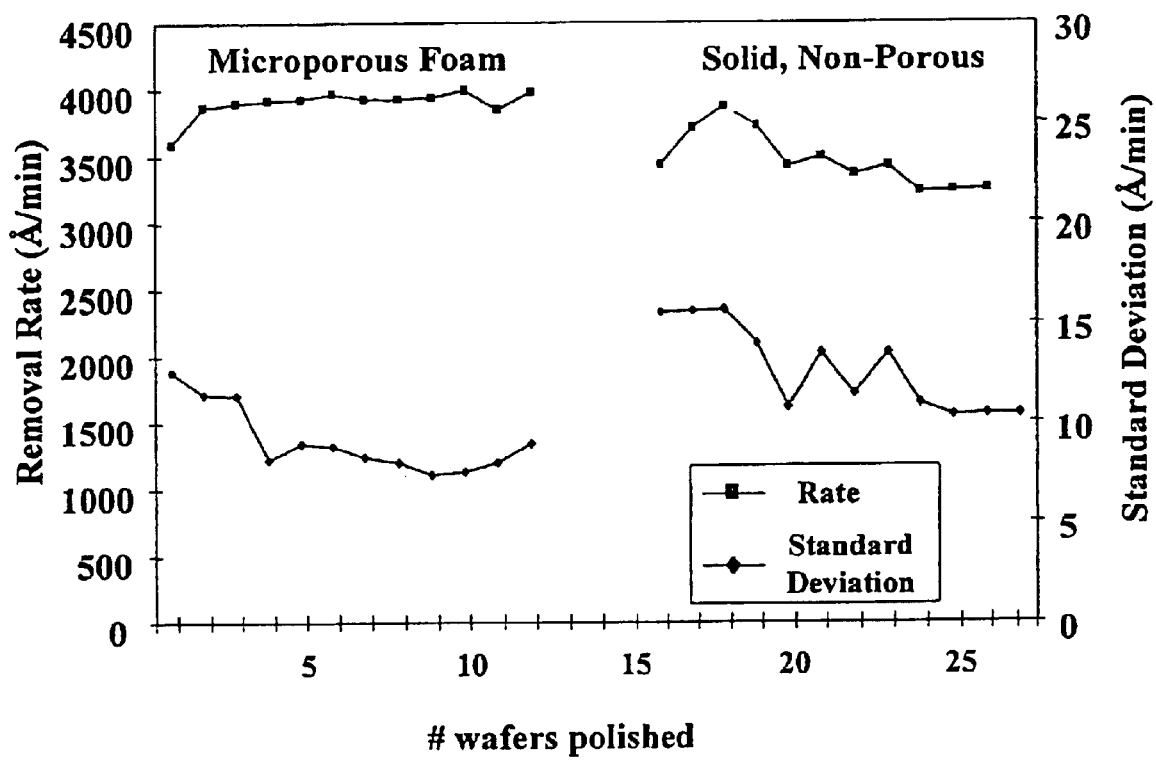
FIG. 6 is a plot of silicon dioxide removal rate versus the number of silicon dioxide wafers polished comparing a microporous foam polishing pad of the invention and a solid, non-porous polishing pad, wherein the polishing pads are grooved and buffed.
Figure 7A:
FIG. 7a is a scanning electron microscopy (SEM) image (20× magnification) of the top surface of a solid, non-porous polymer sheet having a grooved macrotexture that is glazed and clogged with polishing debris after polishing 20 silicon dioxide wafers, wherein the polishing pads are buffed and conditioned.
Figure 7B:
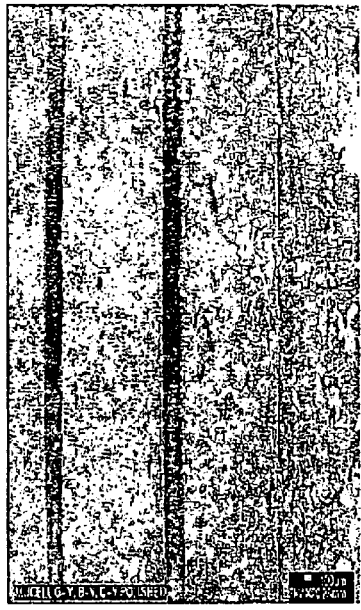
FIG. 7b is a scanning electron microscopy (SEM) image (20× magnification) of the top surface of an extruded porous foam sheet having an average pore size of 15 μm, an density of 0.989 g/cm³, a cell density of greater than $10^6$ cells per cm³, as well as a grooved macrotexture that is free of polishing debris after polishing 20 silicon dioxide wafers (buffed and conditioned).
Figure 7C:
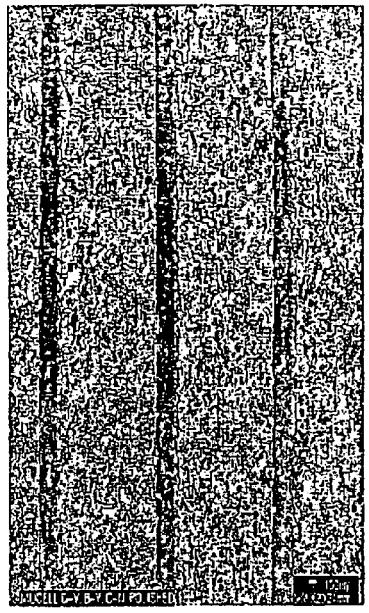
FIG. 7c is a scanning electron microscopy (SEM) image (20× magnification) of the top surface of an extruded porous foam sheet having an average pore size of 15 μm, an density of 0.989 g/cm³, a cell density of greater than $10^6$ cells per cm³, as well as a grooved macrotexture that is free of polishing debris after polishing 20 silicon dioxide wafers (buffed, no conditioning).

Different polishing pads were used to polish silicon dioxide blanket wafers in the presence of the same polishing composition (i.e., Semi-Sperse® D7300 polishing composition sold by Cabot Microelectronics). Polishing Pad 5A (control) was a solid, non-porous polyurethane polishing pad having microgrooves and macrogrooves. Polishing Pad 5B (invention) was a microporous foam polyurethane polishing pad having a uniform pore size of 20±10 $\mu$m or less, which was produced according to the method recited in Example 3 for Sample 3D, and having a density of 0.989 g/ml and a thickness of 0.107 cm (0.0423 in) that was buffed, conditioned (to form microgrooves), and grooved (macrogrooves). The removal rates and non-uniformity were determined for each of the polishing pads as a function of the number of silicon dioxide wafers that were polished. A plot of removal rate versus the number of silicon dioxide wafers polished for each of the Polishing Pads 5A and 5B is shown in FIG. 6. The polishing parameters were carrier downforce pressure of 0.028 MPa (4 psi), a slurry flow rate of 100 ml/min, a platen speed of 60 rpm, a carrier speed of 55–60 rpm. Scanning Electron Microscopy (SEM) images of the top grooved surfaces of the solid polishing pad and microporous foam polishing pad of the invention are shown in FIG. 7*a* and FIGS. 7*b*–7*c*, respectively.

The plot of FIG. 6 shows that microporous foam polishing pads having a uniform cell size distribution have superior removal rates for silicon dioxide blanket wafers compared to solid, non-porous polishing pads. Moreover, the microporous polishing pad of the invention had a very consistent removal rate and low non-uniformity over the course of polishing 20 wafers or more, indicating that the polishing pad did not become glazed over time. The SEM images in FIGS. 7*a*–*c* illustrate that the microporous foam polishing pads of the invention (FIGS. 7*b* and 7*c*) are less prone to glazing during polishing as is observed with conventional polishing pads (FIG. 7*a*).

EXAMPLE 6

This example illustrates that the microporous foam polishing pads of the invention are permeable to and can transport the polishing composition during polishing.

A solid polyurethane polishing pad (Pad 6A, comparative), a microporous foam polyurethane polishing pad (Pad 6B, invention), and a conventional closed cell polyurethane polishing pad (Pad 6C, comparative) were used in a chemical-mechanical polishing experiment using aqueous fumed silica abrasive at a pH of about 11. After polishing 20 silicon dioxide wafers, each of the polishing pads were studied by a SEM X-ray mapping technique, Energy Dispersive X-ray (EDX) Spectroscopy, to determine the extent of penetration of the silica-based polishing composition. The EDX images are shown in FIGS. 8*a*, 8*b*, and 8*c* for Pads 6A, 6B, and 6C, respectively.

Figure 8A:
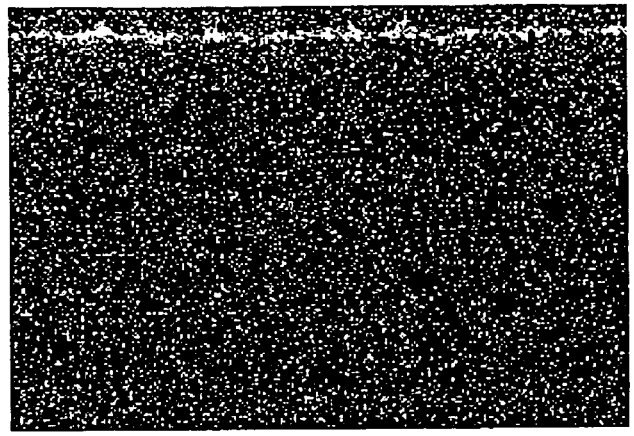
FIGS. 8a, 8b, and 8c are Energy Dispersive X-ray (EDX) silica mapping images of a solid polishing pad (FIG. 8a), a microporous foam polishing pad of the invention (FIG. 8b), and a conventional closed cell polishing pad (FIG. 8c) showing the extent of penetration of the silica abrasive through the thickness of the polishing pad after polishing silicon dioxide blanket wafers.
Figure 8B:
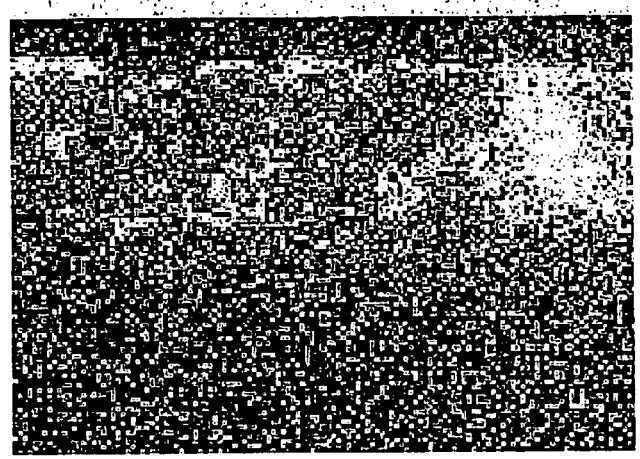
Figure 8C:
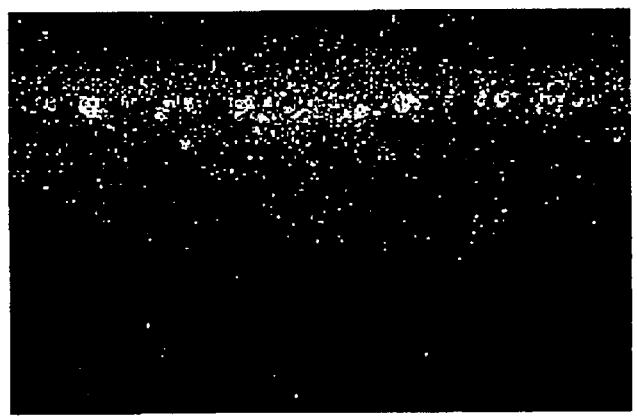

The extent of penetration of the silica abrasive was only about 10 or 15% of the pad thickness for the solid polishing pad (Pad 6A) as shown in FIG. 8*a*. For the microporous foam polishing pad (Pad 6B), the silica abrasive penetrated through at least about 40% of the pad thickness. For the conventional closed-cell polishing pad (Pad 6C), the silica abrasive penetrated through only about 20% to 25% of the pad thickness.

This example demonstrates that the microporous foam polishing pads of the invention are capable of transporting polishing composition abrasive particles well into the body of the polishing pad, while conventional solid and closed-cell polishing pads do not transport the polishing composition into the body of the polishing pad.

EXAMPLE 7

This example shows that the microporous foam polishing pads of the invention have superior polishing rates compared to conventional closed cell microporous polishing pads.

Similar patterned silicon dioxide wafers were polished with an aqueous fumed silica abrasive at a pH of 11 using different polishing pads (Polishing Pads 7A, 7B, and 7C). Polishing Pad 7A (comparative) was a solid non-porous polyurethane polishing pad. Polishing Pad 7B (invention) was a microporous foam polyurethane polishing pad of the invention. Polishing Pad 7C (comparative) was a conventional microporous closed cell polyurethane polishing pad. Each of the polishing pads were buffed, conditioned, and grooved. The planarization rates for a 40% density region having a step height of 8000 Å and a 70% density region having a step height of 8000 Å were polished by each of the polishing pads, and the remaining step height of the feature was determined after 30, 60, 90, 120, and 150 seconds. The results for the 40% dense feature and the 70% dense feature are plotted in FIGS. 9 and 10, respectively.

Figure 9:
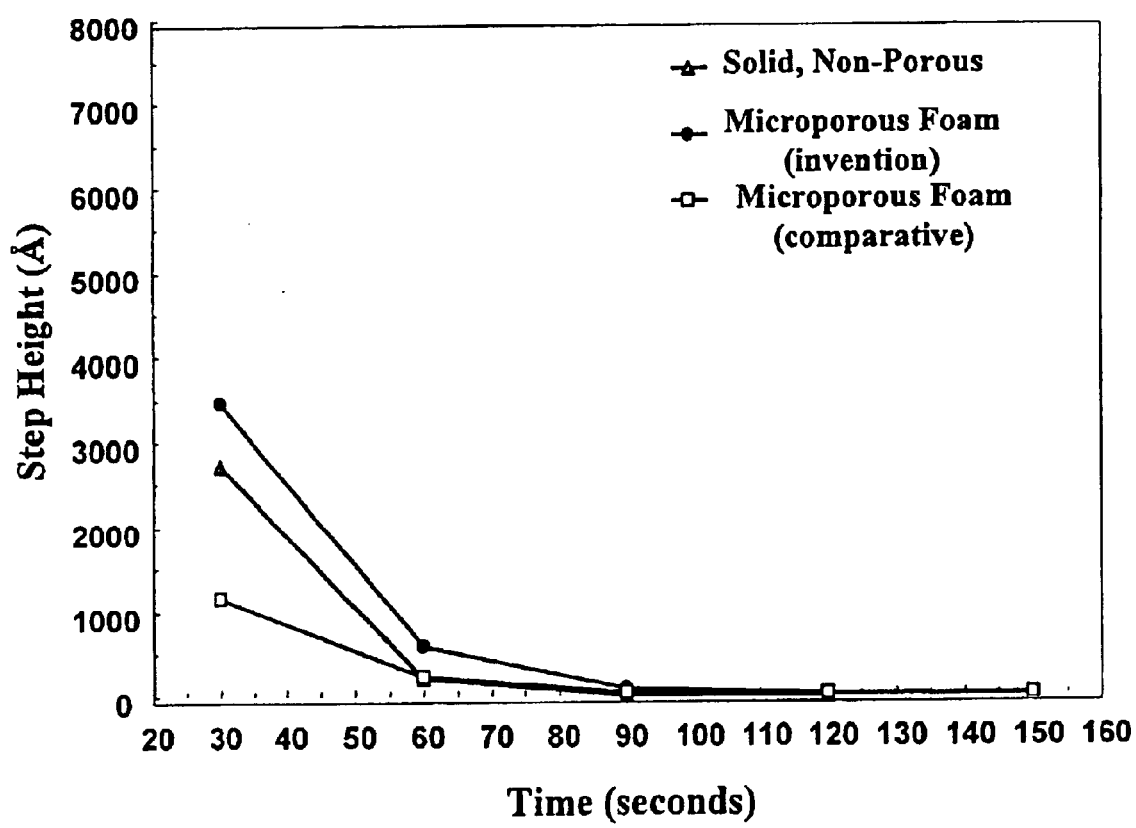
FIG. 9 is a plot of time (s) versus the remaining step height (in Å) for a 40% dense feature of a patterned silicon dioxide wafer comparing the use of a solid, non-porous polishing pad, a microporous foam polishing pad of the invention, and a conventional microporous closed cell polishing pad.
Figure 10:
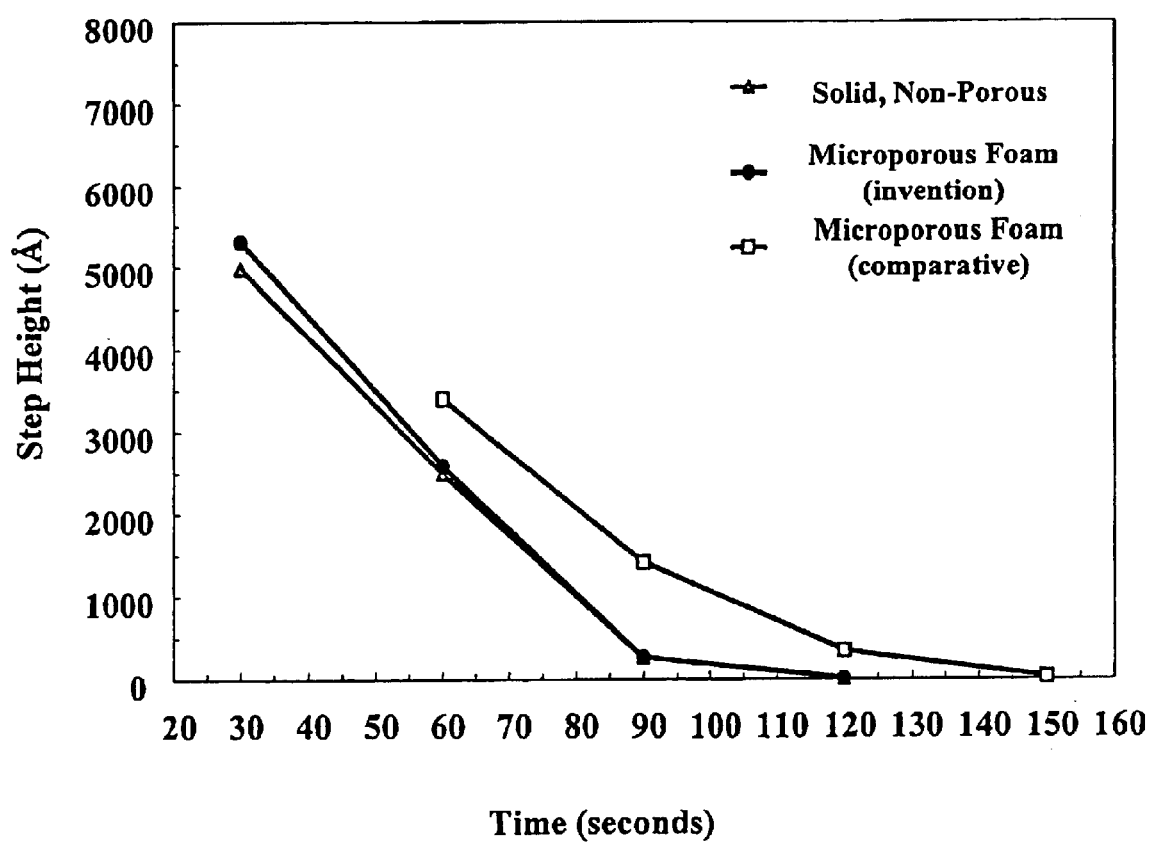
FIG. 10 is a plot of time (s) versus the remaining step height (in Å) for a 70% dense feature of a patterned silicon dioxide wafer comparing the use of a solid, non-porous polishing pad, a microporous foam polishing pad of the invention, and a conventional microporous closed cell polishing pad.

The results depicted in FIGS. 9 and 10 show that for a region of 40% density, all of the polishing pads (Polishing Pads 7A–7C) have less than 1000 Å remaining step height after 60 seconds. However, for a region of 70% density, only Polishing Pads 7A and 7B have less than 1000 Å remaining step height after 90 seconds. Thus, the microporous foam polishing pad of the invention has a superior polishing rate compared to the conventional microporous foam closed cell polishing pad.

EXAMPLE 8

This example illustrates a method for preparing polishing pads of the invention using a pressurized gas injection process.

Figure 11:
FIG. 11 is an SEM image of a solid thermoplastic polyurethane sheet at a magnification of 350×.
Figure 12:
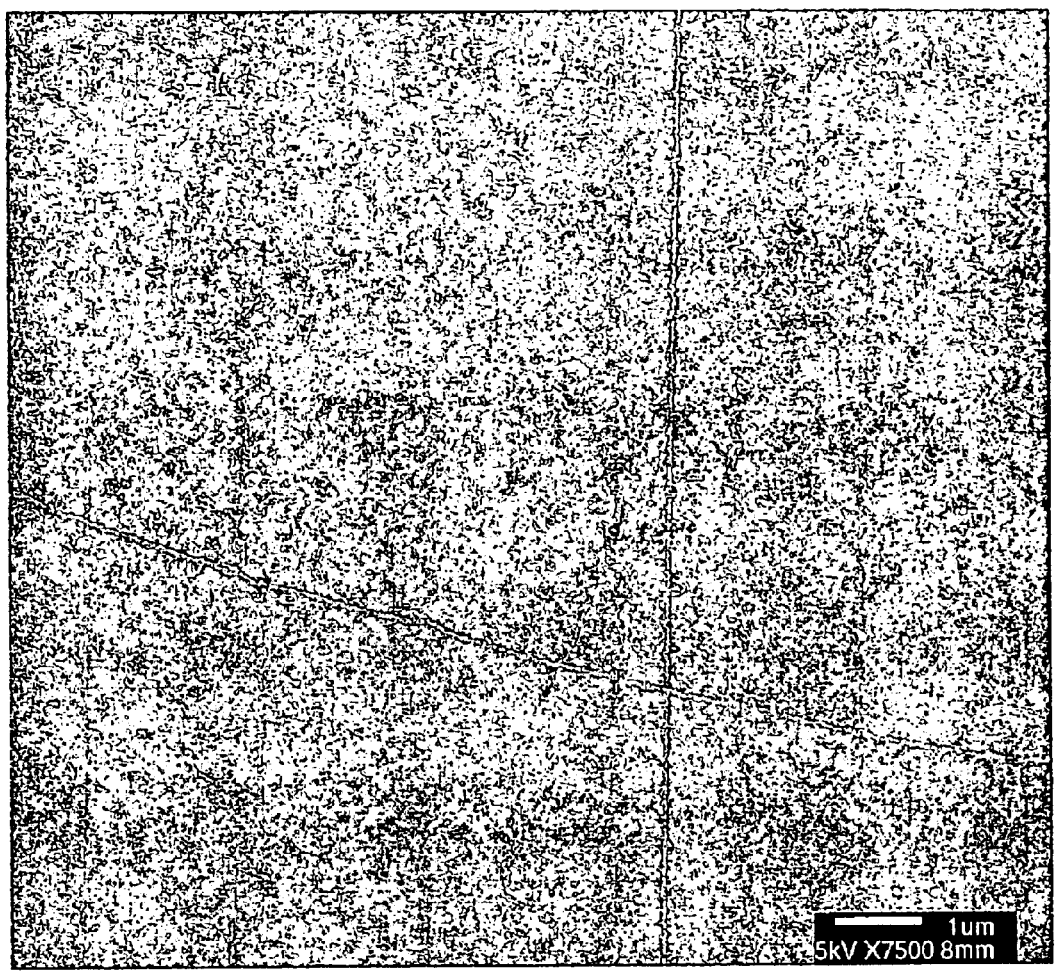
FIG. 12 is an SEM image of a solid thermoplastic polyurethane sheet at a magnification of 7500× that has been treated by pressurized gas injection to produce a foam having an average cell size of 0.1 μm.
Figure 13:
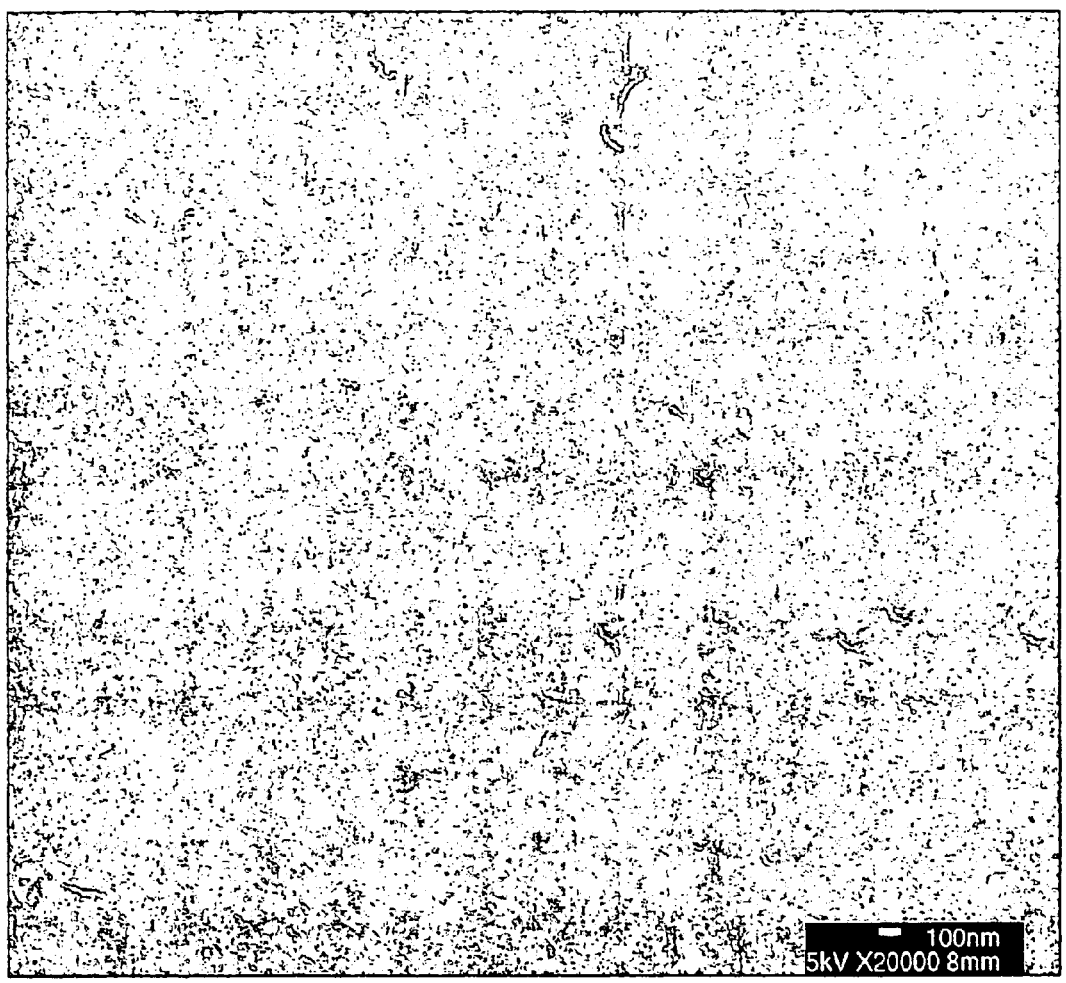
FIG. 13 is an SEM image of a solid thermoplastic polyurethane sheet at a magnification of 20000× that has been treated by pressurized gas injection to produce a foam having an average cell size of 0.1 μm.
Figure 14:
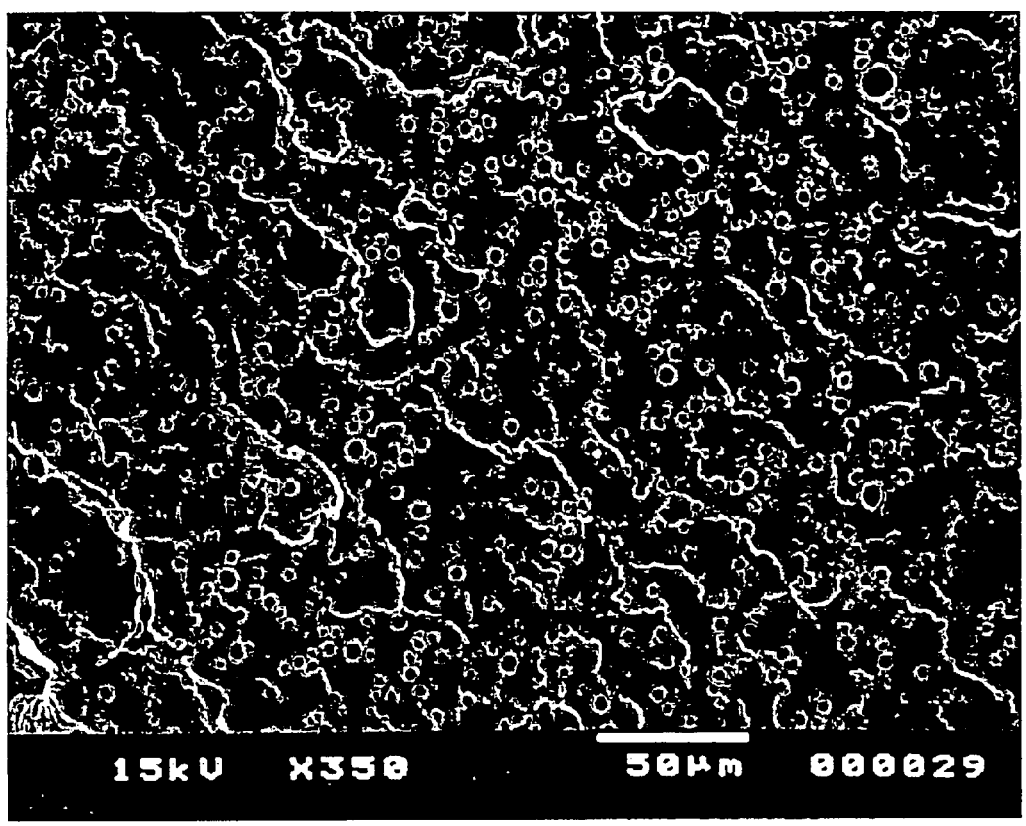
FIG. 14 is an SEM image of a solid thermoplastic polyurethane sheet at a magnification of 350× that has been treated by pressurized gas injection to produce a foam having an average cell size of 4 μm.
Figure 15:
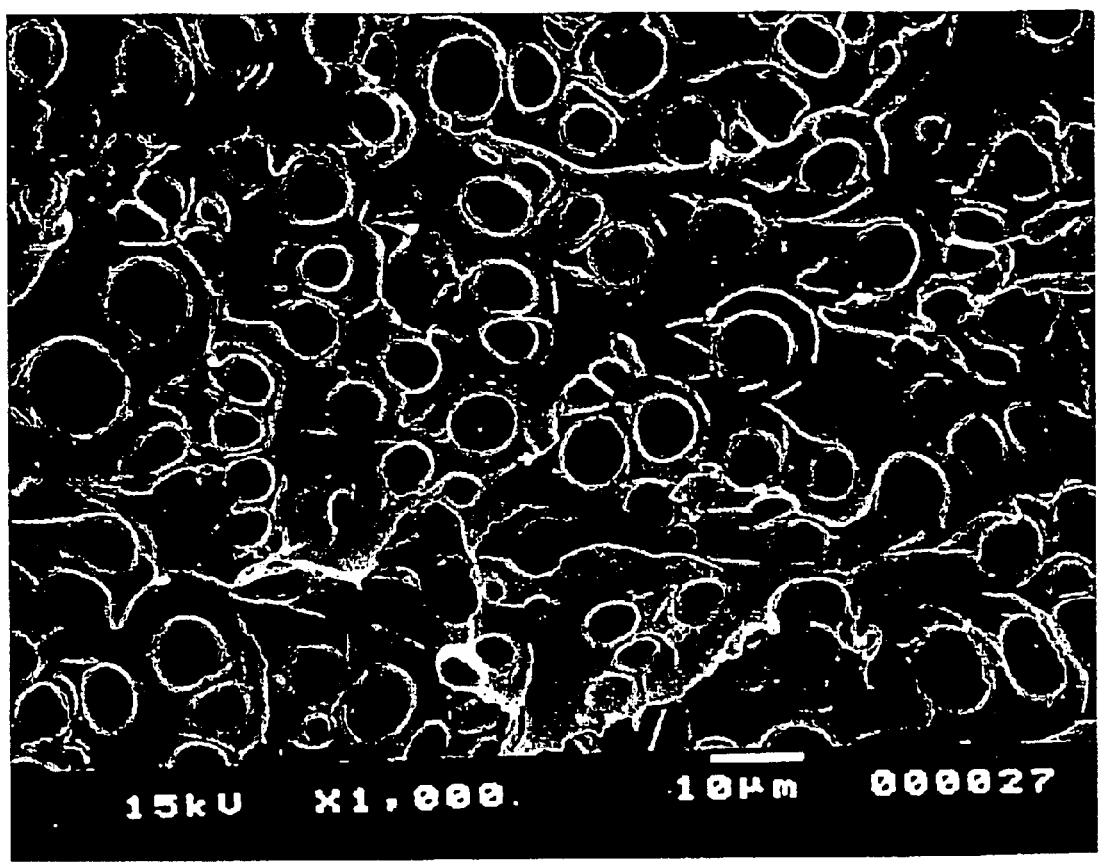
FIG. 15 is an SEM image of a solid thermoplastic polyurethane sheet at a magnification of 1000× that has been treated by pressurized gas injection to produce a foam having an average cell size of 4 μm.

Two samples of solid extruded TPU sheets were placed in a pressurized vessel with 5 MPa $CO_2$ gas at room temperature for about 30 hours. The solid TPU sheets each absorbed about 5 wt. % $CO_2$. The TPU samples (Samples 8A and 8B) were then heated to 50° C. and 97.6° C., respectively, at a saturation pressure of 5 MPa to produce a sheet with an average cell size of 0.1 $\mu$m and 4 $\mu$m (99 cells counted, min 2 $\mu$m, max 8 $\mu$m, standard deviation 1.5), respectively. The average cell sizes were determined using image analysis software. An SEM image of an untreated solid TPU sheet is shown in FIG. 11. SEM images of the foamed TPU sheets (Samples 8A and 8B, invention) are shown in FIGS. 12–15. FIGS. 12 and 13 are at a magnification of 7500× and 20000×, respectively. FIGS. 14 and 15 are at a magnification of 350× and 1000×, respectively.

This example demonstrates that the pressurized gas injection process can be used to produce porous foam polishing pad materials having an average pore size less than 20 μm and a highly uniform pore size distribution.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polishing pad for chemical-mechanical polishing comprising a thermoplastic polyurethane foam with an average pore size of about 50 μm or less, wherein the thermoplastic polyurethane has a Melt Flow Index (MFI) of about 20 or less, a molecular weight of about 50,000 g/mol to about 300,000 g/mol, and a polydispersity index of about 1.1 to about 6.

2. The polishing pad of claim 1, wherein the polyurethane foam has a Flexural Modulus of about 350 MPa to about 1000 MPa.

3. The polishing pad of claim 1, wherein the thermoplastic polyurethane has a Rheology Processing Index of about 2 to about 10 at a shear rate of about 150 1/s and a temperature of about 205° C.

4. The polishing pad of claim 1, wherein the thermoplastic polyurethane has a glass transition temperature of about 20° C. to about 110° C. and a melt transition temperature of about 120° C. to about 250° C.

5. The polishing pad of claim 1, wherein the polyurethane foam has an average % compressibility of about 7 or less, an average % rebound of about 35 or greater, and a Shore D hardness of about 40 to about 90.

6. The polishing pad of claim 1, wherein the polyurethane foam further comprises a polymer resin selected from the group consisting of thermoplastic elastomers, thermoplastic polyurethanes, polyolefins, polycarbonates, polyvinylalcohols, nylons, elastomeric rubbers, styrenic polymers, polyaromatics, fluoropolymers, polyimides, cross-linked polyurethanes, cross-linked polyolefins, polyethers, polyesters, polyacrylates, elastomeric polyethylenes, polytetrafluoroethylenes, polyethyleneteraphthalates, polyimides, polyaramides, polyarylenes, polystyrenes, polymethylmethacrylates, copolymers and block copolymers thereof, and mixtures and blends thereof.

7. The polishing pad of claim 1, wherein the polyurethane foam further comprises a water-absorbent polymer.

8. The polishing pad of claim 7, wherein the water-absorbent polymer is selected from the group consisting of cross-linked polyacrylamide, cross-linked polyacrylic acid, cross-linked polyvinyl alcohol, and combinations thereof.

9. The polishing pad of claim 1, wherein the polyurethane foam further comprises particles selected from the group consisting of abrasive particles, polymer particles, composite particles, liquid carrier-soluble particles, and combinations thereof.

10. The polishing pad of claim 9, wherein the polyurethane foam further comprises abrasive particles selected from the group consisting of silica, alumina, ceria, and combinations thereof.

11. The polishing pad of claim 1, wherein the polyurethane foam has a void volume of about 25% or less.

12. The polishing pad of claim 1, wherein the polyurethane foam comprises closed cells.

13. The polishing pad of claim 1, wherein the polyurethane foam has an average pore size of about 40 μm or less.

14. The polishing pad of claim 1, wherein the polyurethane foam has a cell density of about $10^5$ cells/cm$^3$ or greater.

15. The polishing pad of claim 1, wherein the polyurethane foam has a bimodal pore size distribution.

* * * * *